(12) United States Patent
Brackmann et al.

(10) Patent No.: US 7,714,708 B2
(45) Date of Patent: *May 11, 2010

(54) SMART PALLET-BOX CARGO CONTAINER

(76) Inventors: Rogers F. Brackmann, 2014 Waverly Cir., St. Charles, IL (US) 60174; Jay R. Brackmann, 669 Farnham, Wheaton, IL (US) 60187; Dennis J. Kossnar, 1112 Golf La., Wheaton, IL (US) 60187; David Ash, 780 Poppy La., Bartlett, IL (US) 60103; Jacques M. Dulin, 698 Oak View Pl., Sequim, WA (US) 98382

( * ) Notice: Subject to any disclaimer, the term of this patent is extended or adjusted under 35 U.S.C. 154(b) by 1306 days.

This patent is subject to a terminal disclaimer.

(21) Appl. No.: 11/128,879

(22) Filed: May 13, 2005

(65) Prior Publication Data

US 2005/0232747 A1 Oct. 20, 2005

Related U.S. Application Data

(63) Continuation-in-part of application No. 10/330,149, filed on Dec. 27, 2002, now Pat. No. 7,011,214.

(60) Provisional application No. 60/374,871, filed on Apr. 22, 2002, provisional application No. 60/344,010, filed on Dec. 28, 2001.

(51) Int. Cl.
*G08B 1/08* (2006.01)

(52) U.S. Cl. ............ 340/539.1; 340/572.1; 340/539.13; 340/585; 340/825.36; 180/290

(58) Field of Classification Search .............. 340/572.1, 340/425.5, 539.1, 539.13, 585, 825.36; 180/290; 414/462; 206/509

See application file for complete search history.

(56) References Cited

U.S. PATENT DOCUMENTS

| 2,269,622 A | 8/1939 | Downing |
| 2,607,518 A | 5/1949 | Cohen |
| 3,240,408 A | 10/1963 | Lapansie |
| 4,102,540 A | 7/1978 | Fox et al. |
| 4,415,298 A | 11/1983 | Voigt |

(Continued)

OTHER PUBLICATIONS

SAVR Communications—SmartContainer for Pharmaceuticals and High Value Biological Medications.

(Continued)

*Primary Examiner*—Anh V La

(57) ABSTRACT

Smart cargo container system comprising auditable, secure, sealable, stackable, trackable and pollable, universal, "pallet boxes" used: 1) auto-latchingly secured to the under-carriage transverse I-beams of over-the-road semi-trailers by means of a guiding latching system; and 2) stackable, up to three or more high, in the trailers or warehouses. Sophisticated battery-powered electronic locks, sensors and alarms are provided, as well as an RF communications and GPS locator module that radios to a base station the time, location and status of the inventive smart cargo container, and any anomalous events as they occur, including unauthorized attempts to open or break into the container, or potential damage events. In addition, both the locks and comm modules are programmable, and provide extensive, and selectably pollable and downloadable event, access and transport history and audit trails. The comm system permits remote tracking and real time status check via the Internet, LAN or WAN wireless networks.

20 Claims, 18 Drawing Sheets

U.S. PATENT DOCUMENTS

| | | | |
|---|---|---|---|
| 4,566,296 A | 1/1986 | Kochakis | |
| 4,566,588 A | 1/1986 | Kataczynski | |
| 4,746,034 A | 5/1988 | Ata et al. | |
| 4,878,605 A | 11/1989 | Doyle et al. | |
| 5,125,710 A | 6/1992 | Gianelo | |
| 5,269,414 A | 12/1993 | D'Hollander | |
| 5,281,499 A | 1/1994 | Bussard | |
| 5,310,303 A | 5/1994 | Betts | |
| 5,319,362 A | 6/1994 | Hyatt, Jr. | |
| 5,345,370 A | 9/1994 | Murray et al. | |
| 5,359,505 A | 10/1994 | Story et al. | |
| 5,452,811 A | 9/1995 | Taravella et al. | |
| 5,645,184 A | 7/1997 | Rowse et al. | |
| 5,656,993 A | 8/1997 | Coulthard | |
| 5,743,701 A | 4/1998 | Green | |
| 5,745,044 A | 4/1998 | Hyatt, Jr. et al. | |
| 5,774,053 A | 6/1998 | Porter | |
| 5,775,148 A | 7/1998 | Layton et al. | |
| 5,900,610 A | 5/1999 | Kelly, Jr. | |
| 5,917,433 A | 6/1999 | Keillor et al. | |
| 5,960,708 A | 10/1999 | DeTemple et al. | |
| 6,005,487 A | 12/1999 | Hyatt, Jr. et al. | |
| 6,006,918 A | 12/1999 | Hart | |
| 6,082,153 A | 7/2000 | Schoell et al. | |
| 6,142,327 A | 11/2000 | Riggio et al. | |
| 6,416,271 B1 | 7/2002 | Pigott et al. | |
| 6,422,409 B2 | 7/2002 | Kofod | |
| 6,531,216 B1 | 3/2003 | Williams et al. | |
| 6,611,755 B1* | 8/2003 | Coffee et al. | 701/213 |
| 6,661,339 B2 | 12/2003 | Muirhead | |
| 6,718,888 B2 | 4/2004 | Muirhead | |
| 6,787,503 B2 | 9/2004 | Suh | |
| 6,811,895 B2 | 11/2004 | Murasko et al. | |
| 6,842,774 B1* | 1/2005 | Piccioni | 709/207 |
| 6,939,827 B2 | 9/2005 | Shariat | |
| 6,943,678 B2 | 9/2005 | Muirhead | |
| 7,002,472 B2 | 2/2006 | Stratmoen et al. | |
| 7,220,705 B2 | 5/2007 | Hare | |
| 7,233,247 B1 | 6/2007 | Crossno et al. | |
| 7,482,928 B2* | 1/2009 | Brackmann et al. | 340/572.1 |
| 2002/0099501 A1* | 7/2002 | Hilleary | 701/207 |
| 2003/0123965 A1 | 7/2003 | Brackmann et al. | |
| 2003/0125821 A1 | 7/2003 | Trotter et al. | |
| 2004/0041706 A1 | 3/2004 | Stratmoen et al. | |
| 2004/0044493 A1 | 3/2004 | Coulthard | |
| 2004/0168618 A1 | 9/2004 | Muirhead | |
| 2004/0227630 A1 | 11/2004 | Shannon et al. | |
| 2005/0011800 A1 | 1/2005 | Messinger | |
| 2005/0036847 A1 | 2/2005 | Brackmann et al. | |
| 2005/0153113 A1 | 7/2005 | Hseih et al. | |
| 2005/0237184 A1 | 10/2005 | Muirhead | |
| 2005/0241548 A1 | 11/2005 | Muirhead | |
| 2005/0284314 A1 | 12/2005 | Coulter et al. | |
| 2006/0071786 A1 | 4/2006 | Fano | |
| 2007/0281155 A1 | 12/2007 | Tao et al. | |

OTHER PUBLICATIONS

PCT International Search report dated Apr. 24, 2003 for PCT/US02/41542.

* cited by examiner

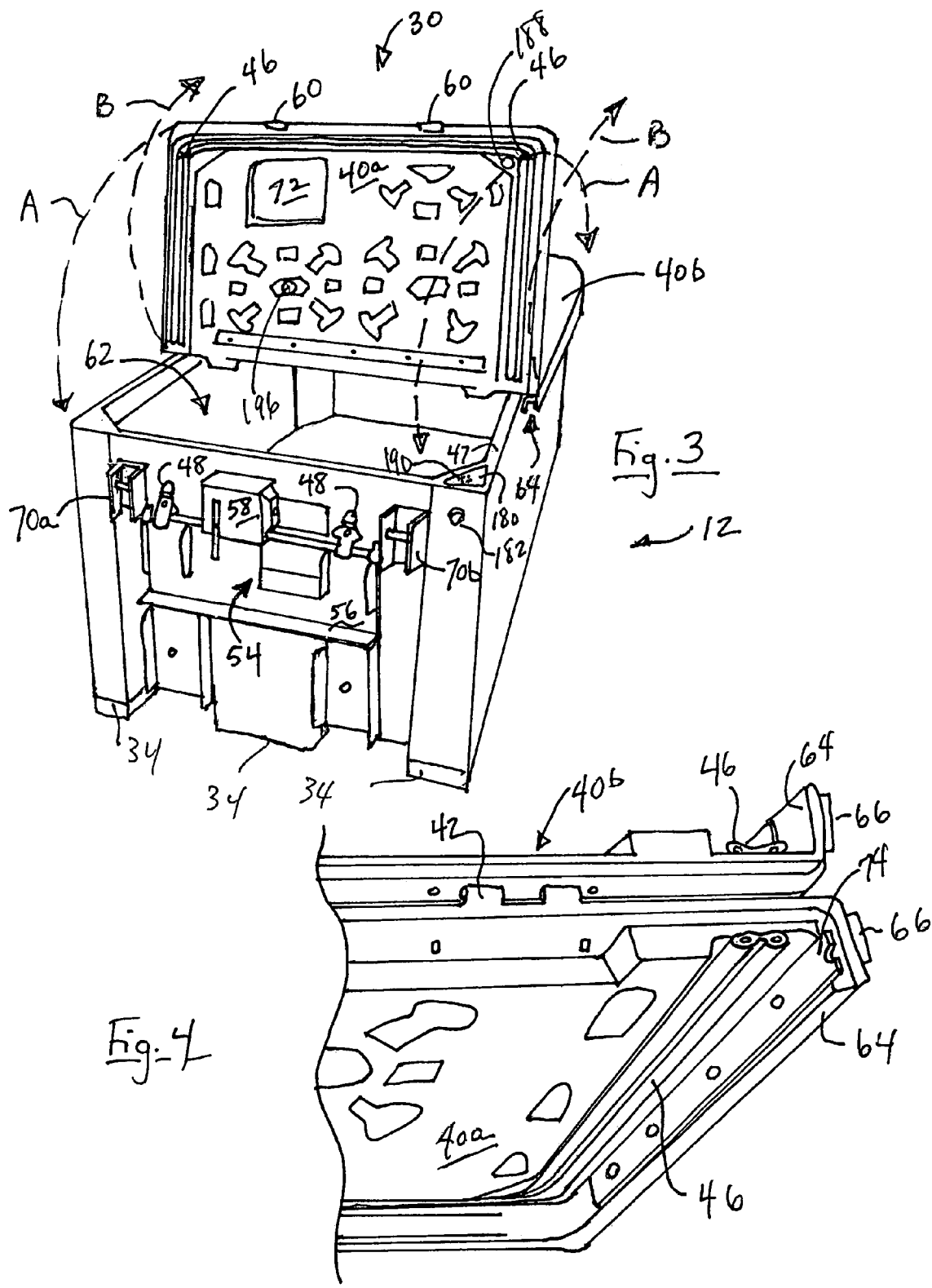

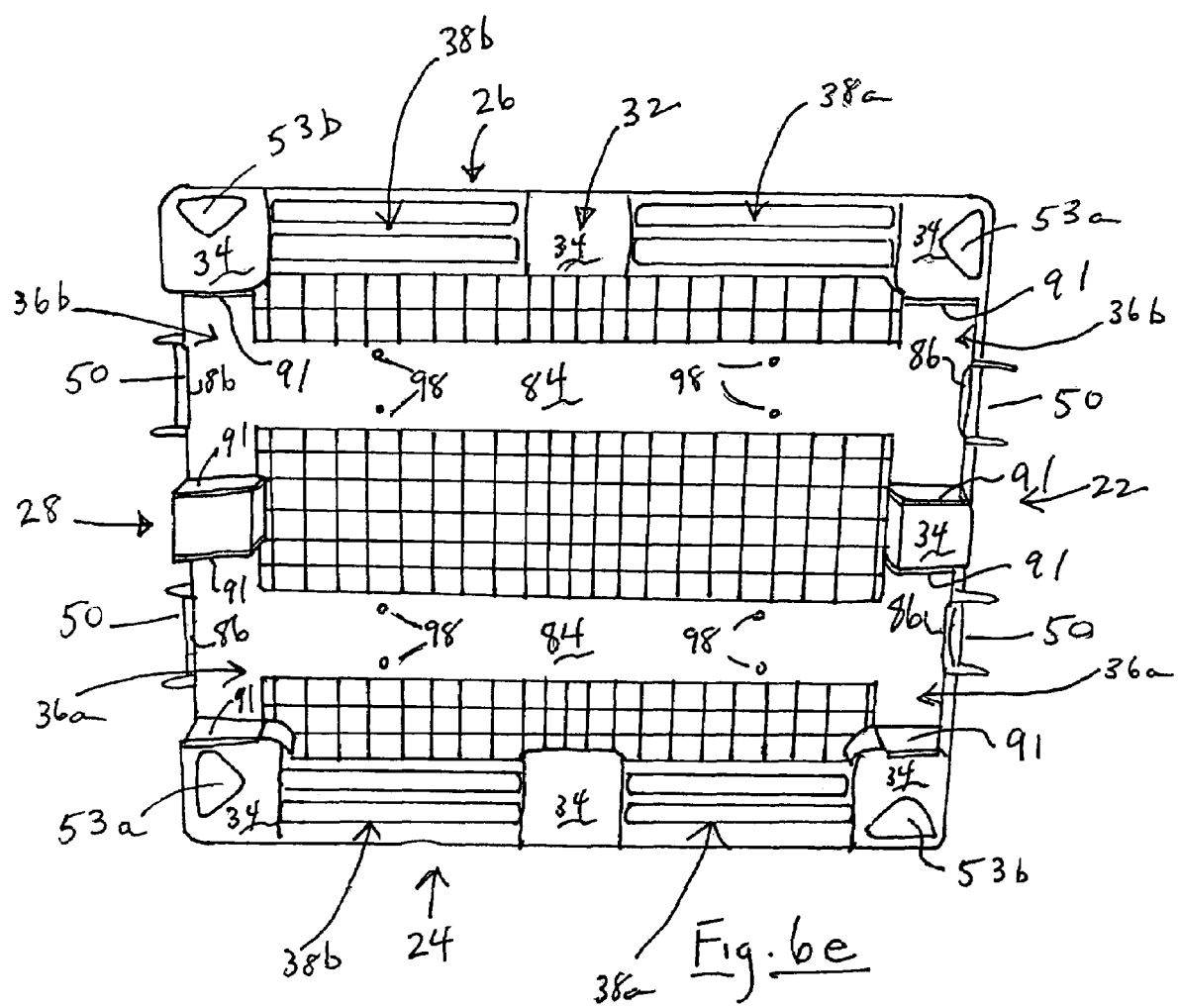

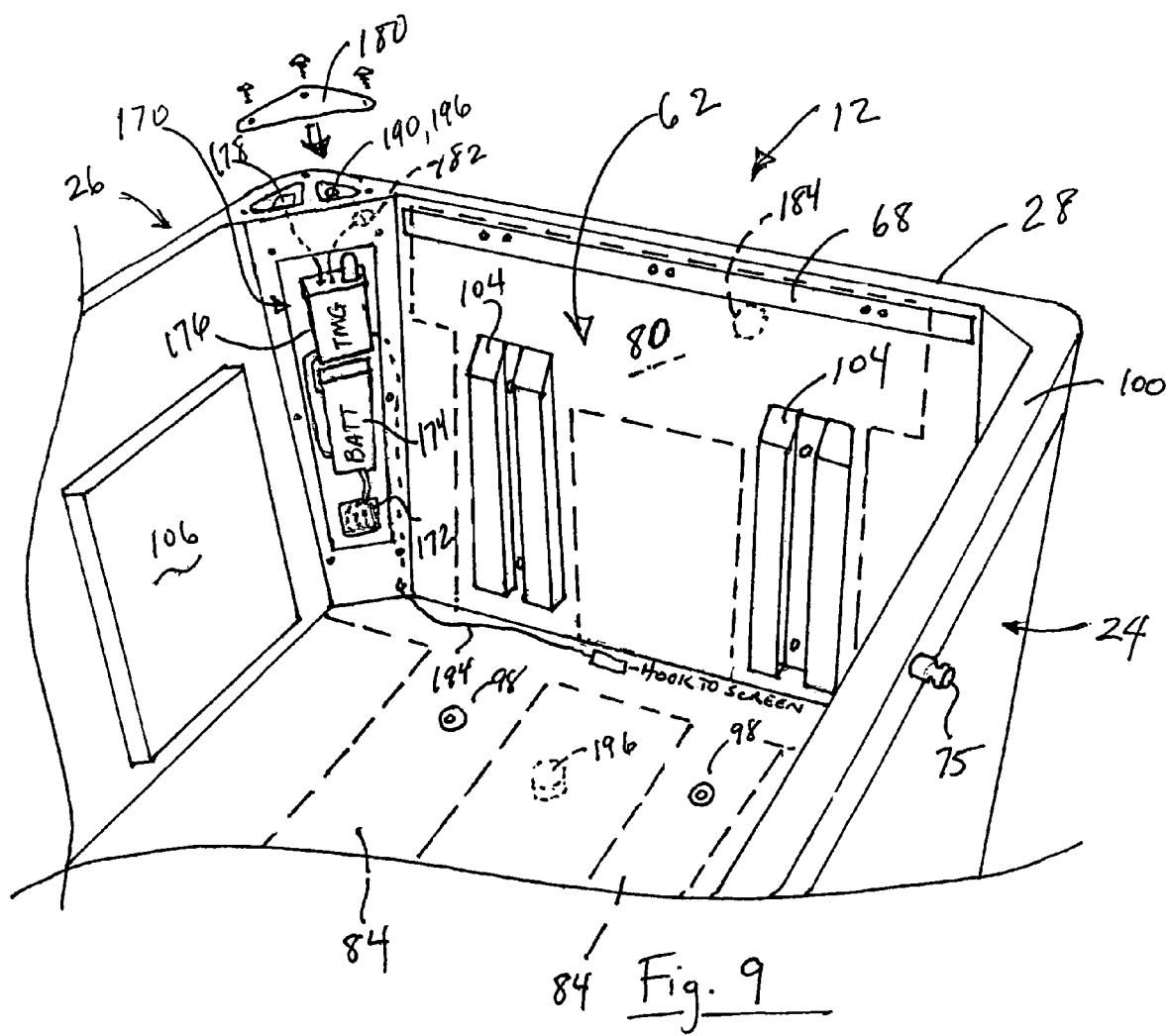

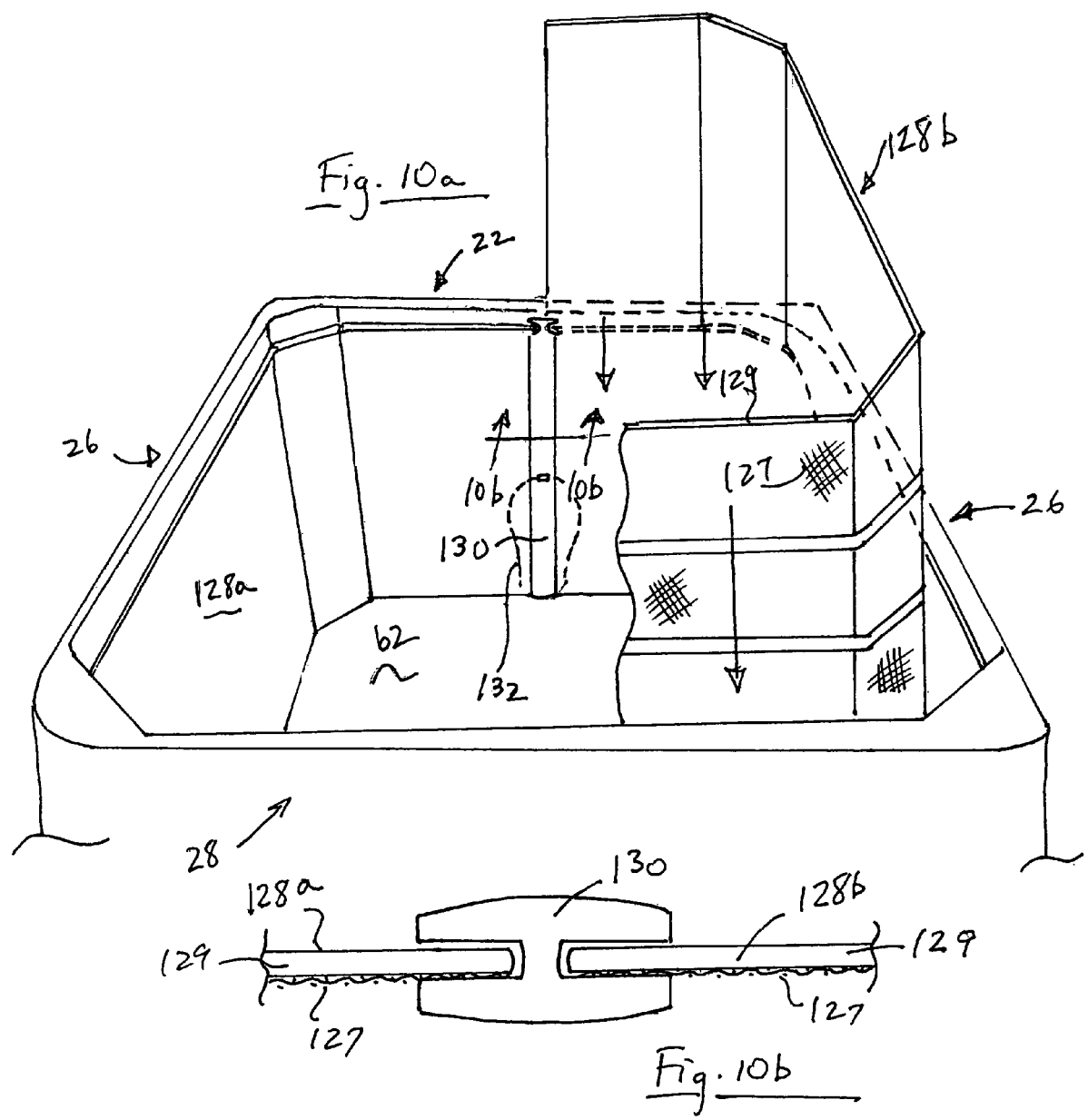

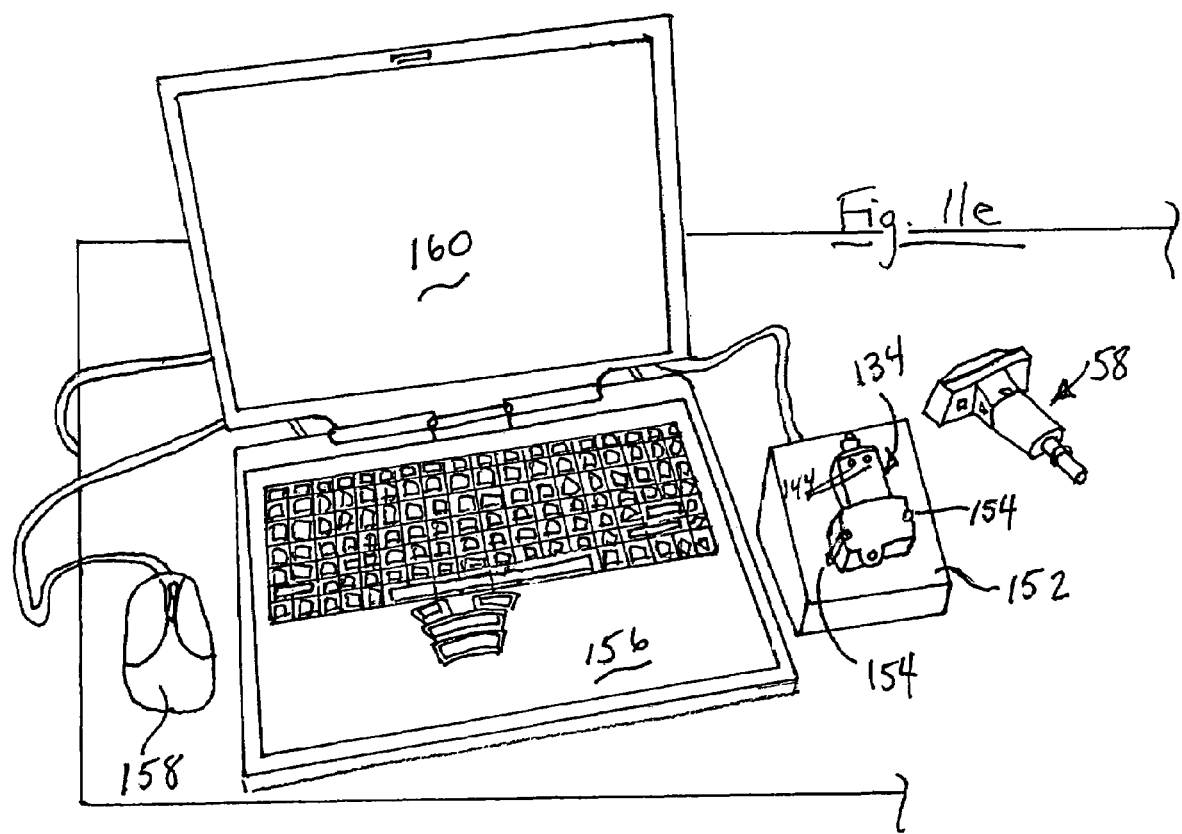

SMART PALLET-BOX CARGO CONTAINER

CROSS-REFERENCE TO RELATED APPLICATIONS

This application is a CIP application of Regular U.S. application Ser. No. 10/330,149 filed Dec. 27, 2002 now U.S. Pat. No. 7,011,214 entitled Private Pallet-Box Cargo Shipping System, which in turn takes its priority from U.S. Provisional Applications Ser. No. 60/374,871 filed Apr. 22, 2002 entitled Private Pallet-Box Shipping System With Universal Hanger and Cam Lock Systems, and U.S. Ser. No. 60/344,010 filed Dec. 28, 2001 entitled Private Pallet Shipping System. This application is also related to application Ser. No. 10/940,447 filed Sep. 14, 2004, a divisional of the same title as its parent application Ser. No. 10/330,149. The disclosures of those applications are hereby incorporated by reference, and the priority benefit of the filing dates of all of them is hereby claimed under 35 US Code Sections 119 and 120, under the Patent Cooperation Treaty and under US Laws and all other applicable treaties.

FIELD OF THE INVENTION

The invention is directed to the field of cargo transportation and more particularly to a smart cargo container system comprising secure (strong and lockable), sealable, stackable, auditable, pollable, and trackable, universal, "pallet boxes" that may be used in two main ways: 1) auto-latchingly secured to the undercarriage transverse I-beams of over-the-road semi-trailers by means of a guiding latching system; and 2) stackable, up to three or more high, inside the trailer bodies and in warehouses and at customer locations. Sophisticated electronic locks, sensors and alarms are provided, as well as an RF communications and GPS locator module that radios to a base station the time, location and status of the inventive smart cargo container, and any anomalous events as they occur, including unauthorized attempts to open or break into the container, or potential damage events such as fire, exposure to high temperature, radiation, biological contaminants, unauthorized movement, shock and the like. In addition, both the locks and comm modules are programmable, and provide extensive, and selectably pollable and downloadable event, access and transport history and audit trails. The comm system permits remote tracking and real time status check via the Internet, LAN or WAN wireless networks.

BACKGROUND OF THE ART

A variety of cargo container systems have been proposed in the prior art but have not developed into a universal system for cargo transport that answers the complex needs of both shipping customers and the trucking industry.

Companies typically budget 2-4% of the value of a shipment for loss due to theft in transit. A typical type of petty theft occurs from a stacked pallet of merchandise in corrugated containers. A thief will cut or punch a hole in an exposed side of a box, remove some merchandise and then rotate the box to conceal the damaged side. Typical loading dock check-in procedures merely confirm the receipt of a number of pallets containing a number of cartons. Since the time and location of the loss cannot be determined at the time of discovery by simple external inspection, no recovery attempt is made. Such theft losses also occur in the warehouses and back rooms of retailers and wholesalers.

Another common and accepted form of loss is in-transit damage. When items are shipped in corrugated boxes on pallets it is very common for the boxes to sustain corner and end damage that renders them unsuitable for full value retail sale. Many wholesalers and distributors offer a level of claim for damages of 1 to 2% that will be honored without requiring return of goods. These low-level claims are frequently taken as an automatic discount by retailers regardless of the condition of the goods they receive. Additionally, much larger losses due to damage during shipment are not uncommon. Management of such large damage claims, which require return of goods as proof of damage, are very costly. They entail additional shipping costs and substantial administrative overhead, as well as genuine cost of goods due to product loss.

The American Trucking Association reports that the average Class 8 truck having a permitted load capacity of 60,000-90,000 pounds, actually carries a haul weight on average of just under 29,000 pounds (source: ATA Trucking Trends 2000). This represents an underutilization of the truck's hauling capacity in weight of more than 50% on average. The reasons for this are two-fold. First, in some cases, owing to the density of the materials being shipped, the truck simply fills (cubes out) before the weight limit is reached. In this instance undercarriage usage could provide immediate benefit because it effectively increases the carrying volume of the trailer. Second, in other cases, the structural strength of the cargo as packed on un-reinforced pallets does not allow the cargo to be stacked at all, or in other cases does not allow the cargo to be stacked to the full interior height of the trailer.

Accordingly, this exemplary state of the art reveals that there remains a significant and substantial unmet need for universal, fully closeable and lockable pallet containers for secure shipment of a wide range of goods, both interior of the trailer for improved security and under-slung to maximize the unused, permitted carrying capacity of trucks.

THE INVENTION

The invention comprises a smart, pallet-box type cargo container system employing secure (fully closeable and lockable), sealable, stackable, auditable and trackable (via GPS), universal, "pallet boxes" that are used in two main ways: 1) auto-latchingly secured to the under-carriage transverse I-beams of over-the-road semi-trailers by means of alignment and hanger assemblies that guide and latch the pallet boxes securely in place for transport; and 2) stackable, up to three or more high, inside trailer bodies, in warehouses and at customer sites.

As set forth in our co-pending application Ser. No. 10/940,447, the inventive pallet boxes are designed to be optionally secured by hanger/latching assemblies unique to, and retrofittable-on, most types of semi-trailer undercarriages, both US and metric (European, Central and South American, and Asian) standard dimensions. The pallet boxes may be refrigerated, insulated, or atmospherically controlled, e.g., chargeable with preservative, security or disinfecting gases, during shipping.

For both the under-slung and in-trailer-stacked mode embodiments, by way of example, the inventive universal smart cargo containers may be any convenient size, and preferably are typically on the order of 48" deep×40" wide×30" high in size to provide 35 cu. foot capacity. Half-size 24"×40" smart cargo containers are also particularly useful for in-store use, permitting sale directly out of the inventive containers. The box dimensions may be varied depending on trailer undercarriage and interior dimensions, and is preferably selected so that the height, in multiples of 2-6, permits stacking inside the trailer body with enough top clearance to permit sufficient lifting by a forklift so the feet clear the feet-bosses of the box on which it is resting.

The pallet boxes by way of example, may be constructed of any high strength material, and are preferably unitary. Preferred box/bin materials include steel, fiberglass, high strength homopolymers or copolymers, laminated or reinforced polymers (such as carbon and/or glass fiber reinforced polymers), high-density co-molded polyolyfin and steel, or any other available suitable rugged material, available at the present or in the future. It is preferred that a pallet box is capable of carrying from 2000#-3000#, and is capable of withstanding the weight of at least two additional fully-loaded pallet boxes stacked on top of it.

As set forth in our co-pending Ser. No. 10/940,447, optionally, pallet boxes are attached and locked to the semi-trailer under-floor girder I-beams through alignment and hanger hardware. In a preferred embodiment, J-hooks on the hanger assembly engage locking pins on the sides of the pallet boxes, and as the box is raised, the J-hooks rotate into a locked position. In the process, box lid is preferably compressed to assist in keeping it sealed and inaccessible during transport.

In the preferred embodiment, the pallet boxes include an exterior reinforcement structure of fabricated steel, termed an "exoskeleton", that functions to provide: 1) structural strength for stacking and support of the boxes when hung under the trailer; 2) attachment points for retaining the boxes when hung under the trailer bed; and 3) fortification of the box against unauthorized entry for security purposes. Steel "flat" or strapping criss-crosses the lid (4"-6" spacing between adjacent straps) and may align with vertical channels along at least two opposed vertical sidewalls (preferably end walls) of the box. The vertical channels extend to strapping under the floor. Spaced box feet provide apertures for access of the forks of a forklift from any side. A front side includes a lock mechanism with a pivoting, flanged lock cover.

A two-panel, two-hinge top lid is provided for the container, one set of hinges at the midpoint, and the other at the rear as an aid in loading and unloading the box. This permits the front half of the lid to be opened and folded back onto the rear half, and then the folded lid parts to be raised at the back hinge to open the back half of the container. The folded lid in the open position rests in a vertical, but backwardly canted position at the back of the container. This two-panel construction reduces the opening effort and the clearance above the container for opening. In the alternative, the lid could be hinged along the side as a single piece, with the locking assembly on the side opposite the side mounted hinges.

The top is also armored with exoskeleton strapping extending the longitudinal length of the lid and transversely across it. In addition, the lid overhangs the top to protect from fluid entry, and the marginal vertical edge of the lip includes a steel band for strength and security. Notched latch plates that engage grooved studs secured to the side of the box at the mid-point hinges function as anti-pry-open lid locks. The front of the lid includes a pair of slotted tangs that are engaged by cam-type locks on the front side adjacent the top. The underside of the lid includes a wide seal strip adjacent and all around the margin that is aligned with the box side top edges. Thus, when the top is latched and locked, the seal strip is compressed providing a hermetic seal between the box top and side walls of the box. The underside of the lid includes a variety of reinforcing recesses in which various sensors can be disposed. The top corners of the lid includes raised triangular bosses that mate with similarly oriented recesses in the feet of a box stacked on the top of it to prevent the stacked box from sliding during transport.

Additional strapping extends under the box floor so that the steel flat under-box strapping in conjunction with the channels to which the strapping is secured acts as a sling or harness. The box strapping is provided in three panels, a front and a back that are hinged to a bottom panel. Thus, the boxes when loaded under the truck are in fact slung from the J-hooks of the hanger assembly. The steel flat or strapping on the end walls and bottom is typically ⅛" thick stainless steel stock by 3-5" wide; the optional hanger pins on the box ends are typically ⅜"-½" diameter. The top strapping is typically 1-2" wide stainless steel strapping ⅛" thick.

The front steel sling exoskeleton panel of the inventive box included a housing for an electronic lock and a hinged, flanged cover that, when raised completely covers the lock body, and includes a latch plate with a hole that engages the lock plunger. In addition, a pair of spaced cam locks engage the lid strap tang slots and enables the lid to be cinched down, sealing the lid to the box. The cam locks are also completely covered by vertical channels in the lock cover plate. Thus, to resist tampering; there are no exposed parts that act as a purchase for a pry bar. The preferred lock system is a hardened electronic lock mechanism that permits identification of which "keyholder" (approved access person or organization) opens the lock(s), when the lock(s) is/are opened, and how long the lock(s) stay opened, and, optionally, the location. By way of example, a suitable electronic lock is the NexGen high security electronic lock, Model 65 series, provided by Medeco Inc. of Salem, Va., USA, a division of Hillenbrandt Industries, Inc.

The locks and keys are programmable, including both at a home base and in the field, and store several thousand downloadable access events to provide a full audit trail. The programming includes configuring the key to select the time, and by integration with the RF controller and GPS module in the box, the location at which the box can be opened. Thus, the boxes can be both authorized entry and destination restricted.

An important feature of the inventive pallet boxes is that they are each integrated (complete), and highly tamper resistant. That is, there are no loose parts that can be lost during use or storage, and the material is selected for strength to resist both casual and relatively concerted theft attempts. The lock is integrated in the exoskeleton, the top has hidden latch members, and the comm module includes location and sensor systems to provide real-time state of the container data.

The pallet design provides for stacking and racking in any warehouse environment. The box height and floor footprint are chosen to utilize the interior space of the industry standard trailer van when stacked three units high. The lids include bosses that mate with recesses in legs of boxes stacked on top of them so that they can be stacked only in identical orientation or 180° orientation (front over front, or front over back. The steel of the bottom panel exoskeleton includes downward flanges at each side of the front and back fork lift entries to both protect the feet from damage by fork lifts, and to transfer weight to the exoskeleton of the box below it on which it rests.

In addition, spaced feet on the bottom of the pallet boxes provide access between them for the forklift forks. These spaces are present in both horizontal axes in a manner to provide "four-way" accessibility. The loading is a two step process: 1) the forklift brings the closed, loaded pallet box under the truck bed, the guides aligning it as it is laterally placed under the truck, and 2) the fork lift then raising the box to engage the J-clamps, which may be spring-loaded to automatically engage the box fittings.

The pallet boxes have lids that are preferably provided with hermetic seals, for weather tightness and security. This feature provides security for the shipper and is of great benefit for shipping products requiring "privacy" and/or security, such as pharmaceuticals or mail.

Additional objects and advantages of the inventive system include the fact that attaching the weight to the undercarriage of the trailer lowers the center of gravity of the trailer. Thus, the incidences of roll-overs, fairly common in the trucking industry, are less likely to occur. Also, the inventive system provides substantial in-transit theft and damage reduction by virtue of the top being lockable and protected by the exoskeleton strapping and the tough bin wall material. As the inventive pallet boxes are universal in dimension, and include integral pallet-type forklift access, they can be left at the receiving retailer for storage until sale of the goods. Indeed, the inventive pallet boxes permit elimination of the shipping cartons, with the goods being sold directly out of pallet boxes. This reduces the carton cost, the carton packing cost, and the carton volume and weight. More product (goods) can be shipped in the inventive pallet boxes and the carton-related costs eliminated.

Another common and accepted form of transit loss that the invention would reduce is transit damage loss. The inventive rigid and reinforced, integral container substantially and significantly reduces the instance of real transit damage, as well as potentially allowing shippers to lower their thresh-hold for damaged goods claims of the automatic allowance category.

As to the truck hauling-capacity underutilization issue, the reinforced stacking strength of the inventive pallet boxes provides superior volume utilization of the interior cargo space by virtue of the stackability. If, even after stacking the interior of the trailer van, the truck is still under weight-capacity, further benefit is gained by use of the inventive pallet boxes in the under-slung mode. Further, the under-slung system may be used for fast delivery of partial loads, as the pallet box units can be location-dedicated, carrying single or mixed product loads. The speed and ease of unloading, without opening the main (rear) doors of the trailer permits small load distribution at an economically effective rate.

In connection with tracking and enhance security, each smart container is provided with a sensing communications module comprising sensors, controller, RF transceiver, GPS locator unit, battery and trickle charger. The sensors are distributed through the box and include a sensor screen system comprising conductive screen mesh adhered to the outside of thin, rigid inner box liner (of ABS plastic, for example) that is electrically connected to the controller. Other sensors are ultra-short range battery powered RF or hard wired sensors that report sensed condition data to the controller. The GPS unit inputs location data to the controller which sends out data burst transmissions on pager, cell phone or other network frequencies to relay stations or home base. Instead of the screen, one or more RF sensor(s) can be used to detect breaching of the container walls, top or bottom, such as a light detecting sensor that sends a signal to the controller if an aperture as small as a crack forms in any of the box walls.

The smart container data communication and management system includes sensors, locks, alarms, container armed status lights, data encoders, transmitters and/or transceivers, computer programs, data bases, and related equipment to enable activation, coding, decoding and use of the data communications system, including real time and past history display of status and location, and management and operation report generation. The inventive smart cargo container monitoring and management electronic data communications system includes container-mounted components, separate remote signal relays (towers and satellite), monitoring station components, and auxiliary equipment including locators (GPS locators) and locking systems. The home base monitoring station includes a computer system having a CPU in which is loaded data engine, display programs and web server or web browser programs to enable activation, operation and use by customers of the data system.

Each shipper, customer or other authorized tracker can access data on individual ones of the smart cargo containers or groups of them via a customer or user name and password on an SSL server webpage. The tracker can poll where the container is, and the location provided by the container's GPS/GSM unit will be displayed on a map. In addition, in the case of an anomalous condition being sensed, such as: unauthorized unlocking; attempt at tampering, entry or opening of the container; unlocking at an improper location; sensing temperature, humidity, chemical conditions, and the like, the home base or web site system will wake up and emit an alarm, including audio, visual, sending of e-mails, faxes and phone calls, to a selected number and type of individual for response. The remote monitoring aspects of the invention provides a method for shippers, customers, and security/audit personnel to monitor from a single "home" base, many containers simultaneously, the number ranging easily in the thousands. Under the inventive system, the tracking personnel can be notified and check when anomalous events occur and can have a complete handling report for each container from empty before loading to empty upon unloading at its destination, and with confidence in the security of the container along the route, including in the transport vehicle (truck, ship, rail, aircraft), in its origination facility, ware-houses or transfer depots along the way and to destination unload or storage.

The inventive security system provides a unique identifier for each container in the field that is radioed to home base when the container is first put in use. Each container is pre-configured at home base (e.g., home warehouse, customer or shipper facility, manufacturing facility or the like), or in the field via the PIC program with a unique identification number or other data (name of customer, shipper, type of goods permitted to be shipped, etc), and its cycle of time for status reporting is pre-selected at that time. After loading and closed, it is initialized or enabled, and thereafter the container reports its status, the time, or/and location back to home base on the predetermined timed cycle, e.g., every half-hour, more frequently at night, less during the day, etc.), or to pollers (very short range, long-life battery powered microprocessor-controlled RF transmitters that are placed at various sites around the warehouse, storage facility or customer location), or readers (long range, 100-1500' depending on antenna) transceivers with the ability to receive an interpret the data from the container transponders and then forwarding this information by wired or wireless communication to a computer or computer network for real time location and status data retrieval from the containers). The program at home base displays a map from the map program with each container or group of containers located thereon with a unique icon, and the status can be indicated in text or change of icon, e.g., by animating the icon, changing color, flashing, change of text, combinations of them, and the like. In addition, an audio alert signal can be emitted on the computer speakers when the sensor or lock detects an anomalous event or unauthorized, untimely, or wrong destination attempts to open the container occur.

The inventive computer-based smart cargo container system permits complete management of the container security during transport, storage, loading and delivery, as a business, including communication via the Internet of container status and event reports, orders, billing, e-mail communications, and the like.

The controller/RF/GPS units are included in a module that is loaded in a special bay or recess in one of the legs of the box, or in other convenient location. A GPS unit can also be included in with the goods loaded therein at the time of sealing by the originating shipper or manufacturer. Customs or other security wires and seal systems may also be used. The lid lock may be programmable, e.g., activated by magnetic cards or keys, or of the push-button or dial type, to name a few examples.

It is preferred to include a loud, 60-100 DB battery-powered audio alarm system in the smart container. Preferably the alarm noise-maker is disposed in the front wall of the container behind a speaker grille. This alarm is activated by simple magnetic or button type contact switch elements in the lid and top of the box wall, respectively. The switch which arms or turns the alarm off is hidden behind the electronic lock cover plate. After unlocking the cover plate, the switch is accessible and is turned off so the top can be opened.

One skilled in the security art will appreciate that any desired level of security can be employed, dependent on the value and need, such as national security, anti-terrorist, intellectual property confidentiality, or other such need.

BRIEF DESCRIPTION OF THE DRAWINGS

The invention is described in detail below by reference to the drawings, based on photographs of the inventive box in which:

FIG. 3 is an isometric view of the inventive smart cargo container with the front lid lock assembly opened and the front half of the lid opened;

FIG. 4 is an isometric close-up of the inside of the lid center hinge, showing the seal strip and anti-pry latch;

FIG. 6e is a view of the bottom of the inventive smart cargo container showing the center exoskeleton panel and the stacking recesses for receiving lid bosses of a container on which it is stacked;

FIG. 9 is an isometric of the body interior reinforcing plates bolted through the box walls to secure front and back end wall exoskeleton panels;

FIG. 10a is an isometric, partly exploded view of the interior of the smart cargo container showing insertion and placement of the side walls security screens;

FIG. 10b is a section view along lines 10b-10b of FIG. 10a of the H-connector that retains the interior security screen panels;

FIG. 11e is an isometric of the hardware for configuring use authorizations and audit trail downloads of the electronic key with the inventive smart cargo container;

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
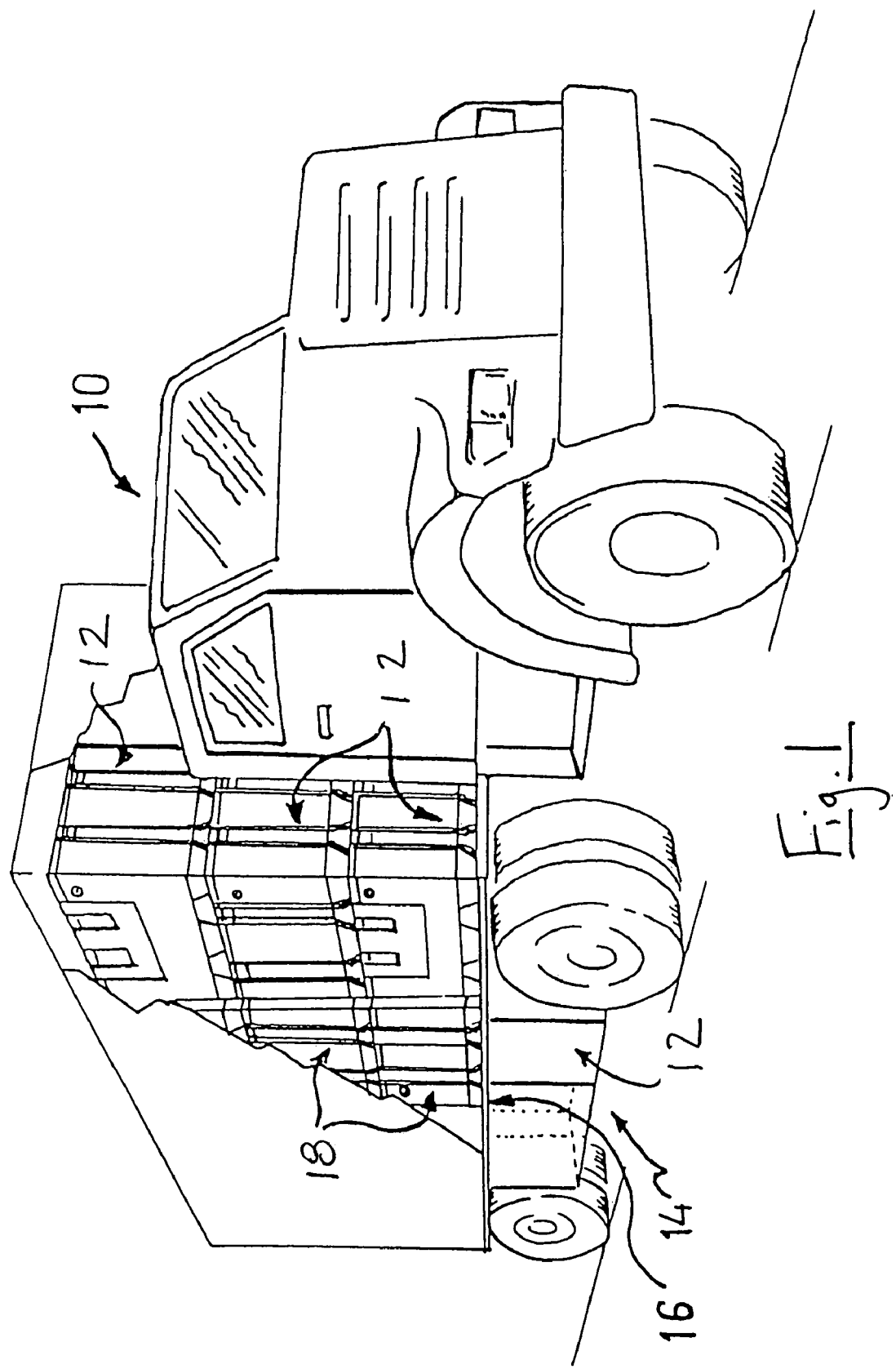
FIG. 1 is a perspective view, partially schematic, of a long-haul truck of the tractor-trailer type showing the inventive smart cargo containers in both the underslung transport mode and the in-trailer, stacked mode in the broken-away portion of the trailer.

FIG. 1 is a perspective view, partially schematic, of a long-haul truck of the tractor-trailer type showing the inventive smart pallet-box type cargo containers in both the under-slung transport mode and the in-trailer-stacked mode in the broken-away portion of the trailer. A long-haul truck 10 of the tractor-trailer type is shown with inventive smart cargo containers 12 in both the under-slung mode 14 secured to the undercarriage of the trailer 16, and the in-trailer mode 18, the broken away section showing smart containers 12 stacked three-high. The under-slung mode 14 shows a single container 12, with the positions of two more shown just aft of it in dashed outline. It can be seen that the currently unused space under the truck is efficiently utilized. Note that the location under the trailer does not appreciably increase the wind resistance, and indeed can serve to reduce the air turbulence created by the tractor wheels, which in turn can reduce blinding spray thrown up by the truck in rainy or snowy weather.

Figure 2:
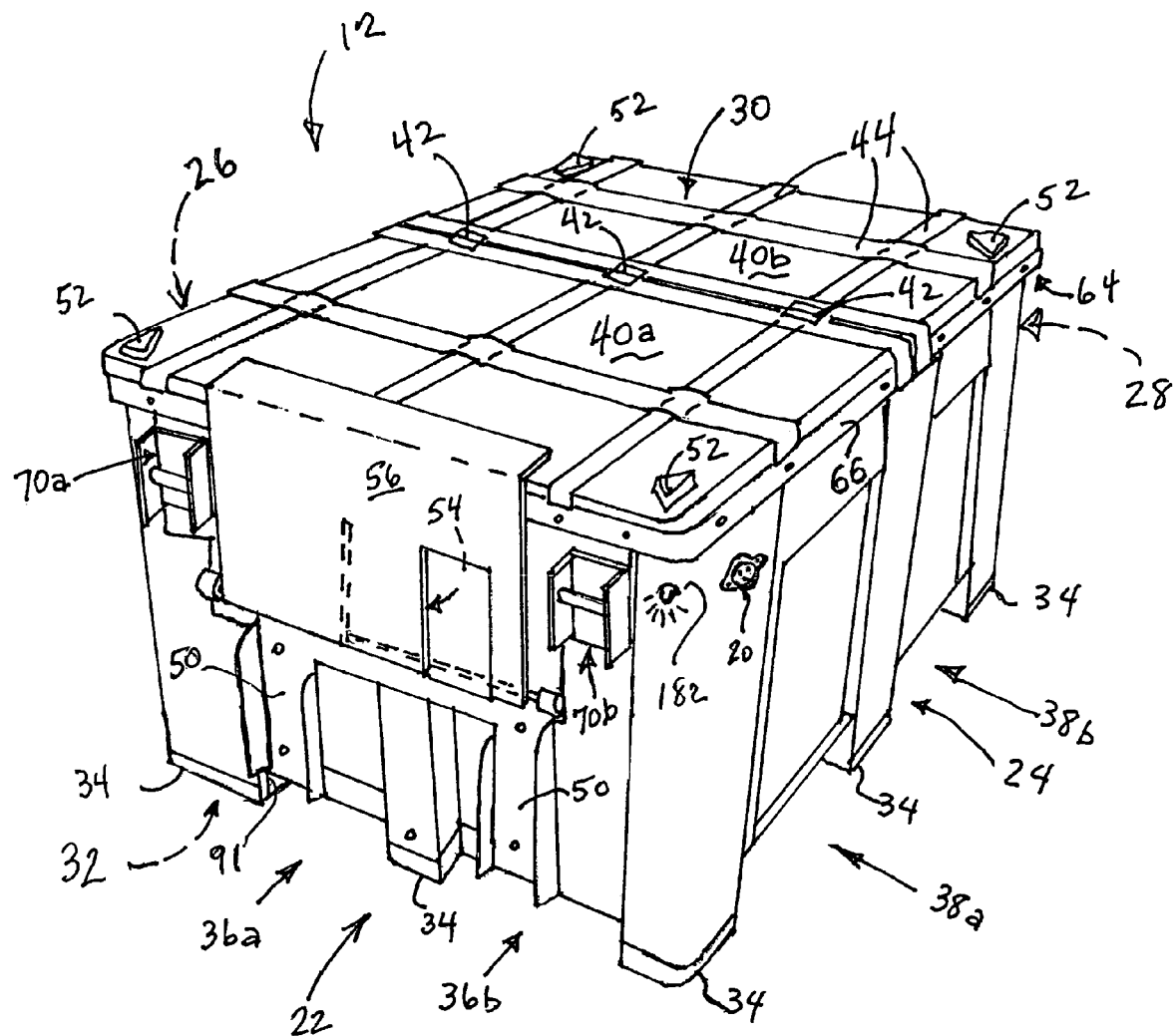
FIG. 2 is an isometric view of the inventive smart cargo container, closed and locked.

FIG. 2 shows a first, preferred embodiment of an inventive smart cargo container 12 in the closed and locked state. The container has a body and top, including a front side 22, spaced side walls 24, 26, back side 28, openable top 30, and bottom 32 with spaced feet 34 providing access 36a, 36b, and 38a, 38b for four-way forklift access. The smart container can be handled in the same manner as a pallet, yet is secure both in storage and in transit, hence the inventive smart cargo container is also known as a "private" pallet box.

As compared to our prior application Ser. No. 10/330,149, the instant container includes security sensors, alarms, anti-pry latches, electronic locks and audit trail keys and communication systems. The access-controllable locking system is auditable, and the pallet-box type container is trackable and pollable to determine its security condition (or state) and its location, access and security condition history. Thus, those features together with its exoskeleton harness and lid locking and anti-pry system, the container is "smart" being both secure and "aware", in that it can ascertain its location, condition and history throughout its use. An selected amount of memory capacity can be integrated in the electronics to provide an extensive auditable and downloadable history file; in that aspect of the functionality, the inventive smart container "knows" its handling history.

The front side of the smart container 22 preferably includes a two-panel top lid that is hinged at the back (see FIG. 5) and at the mid-section 42, to fold back and up (best seen in FIGS. 3-5) once the lock 54 of the container is unlocked and the flanged lock cover 56 is lowered. An exoskeleton-type load harness includes interlaced lid strapping 44, lid edging 66 and front, rear and bottom exoskeleton panels (80, 82 and 84, best seen in FIG. 6b). The front and rear panels include channels 50 and hinges at their bottom edges (best seen in FIG. 6b). In addition, for under-slung transport, the smart container optionally can include hanger brackets 70 having pins that engage J-hooks or the like of the truck underbody hanger assembly, as set forth in our copending Ser. No. 10/940,447. The lid also preferably includes bosses 52 that fit in recesses of the feet of a box stacked on top of it, to prevent shifting during transport (see FIG. 6e).

FIG. 3 is an isometric view of the inventive smart cargo container 12 with the front half of the lid 40a opened for access to the interior load space 62. Lock assembly 54 has been opened, allowing flanged lock cover 56 to be pivoted downward into the open position. Arrow A shows the motion path of front lid half 40a, which can pivot forward into the closed position, or backward to rest on top of rear lid half 40b. Arrow B shows the upward path of rear lid half 40b, best seen in its open position in FIG. 5. With the smart box lid 30 now open, the load volume of the box 62 is revealed. Note the recesses in the inside surface of lid 30, which provide 3-dimensional structural strength as well as protected, retaining spaces for electronic sensors inside the box 12.

FIG. 4 is an isometric close-up of the inside of the lid center hinge 42, showing the seal strip 46 and metal, notched anti-pry latch bar 74 bolted through the lid edges to lid perimeter steel band 66. Hinges 42 permit the top surface of front lid half 40a to rest on rear lid half 40b. Rubber or polymeric foam lid seal strip 46 extends around the inside perimeter of lid halves 40a and 40b, suitably positioned to contact box lip 47 when the lid 30 is closed, thus providing a good gas and water-tight seal.

Figure 5:
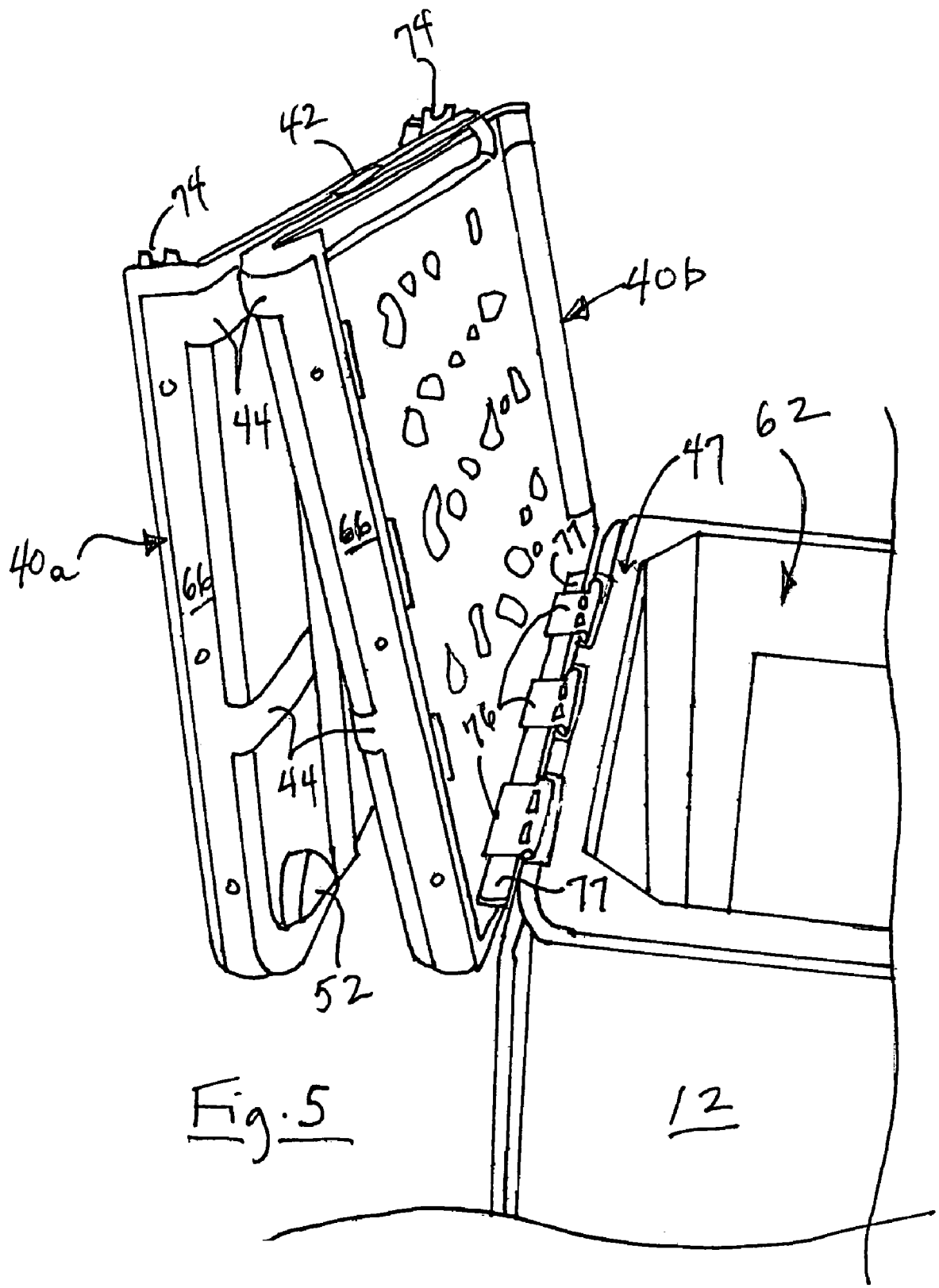
FIG. 5 is an isometric of the inventive smart cargo container with the lid fully opened, but not removed, showing the rear hinge attachment to the container body.

FIG. 5 is an isometric of the back end of the inventive smart cargo container 12 with the lid 30 fully opened, but not removed, showing the rear hinges 76 attached to the container lip 47 via a reinforcing strap 77. Lid 30 remains upright because of rear hinge stops 96, best seen in FIG. 6d. With lid 30 in this position, the load volume 62 is completely accessible for loading and unloading cargo.

Figure 6A:
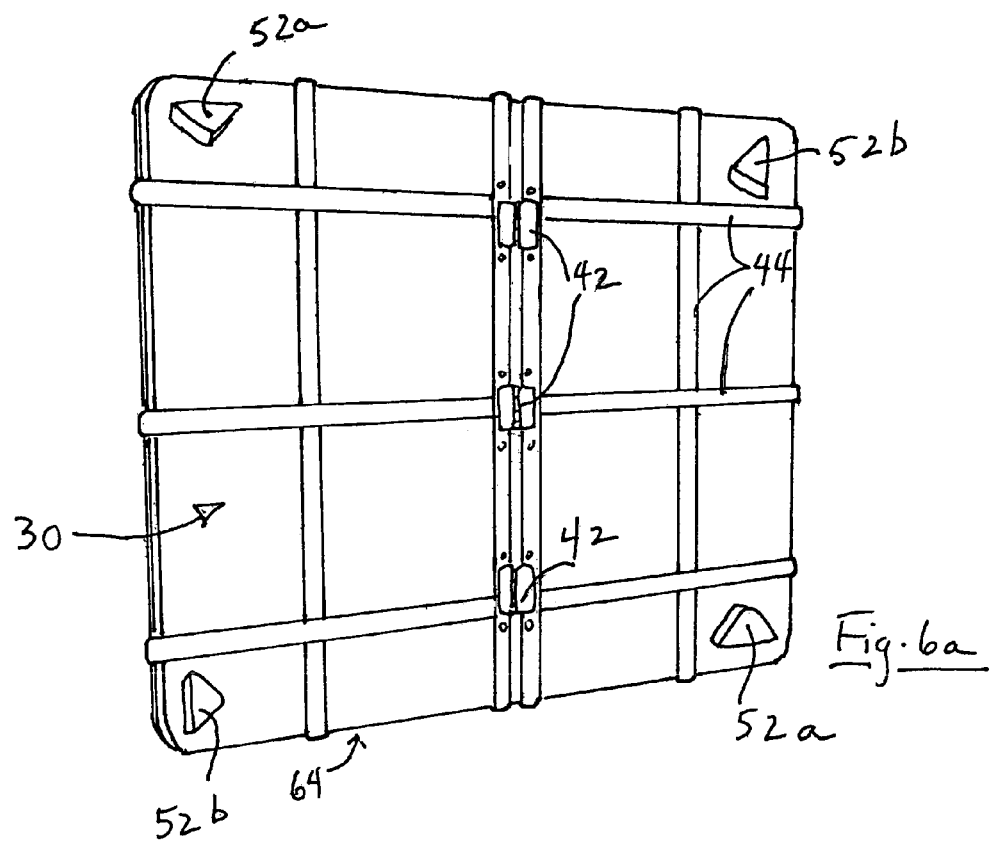
FIG. 6a is an isometric showing the top of the lid, the transverse hinges, exoskeleton strapping, and the corner stacking bosses.

FIG. 6a is an isometric showing the top of the lid 30, the transverse mid-hinges 42, exoskeleton strapping 44, and the corner stacking bosses 52. Note the lid bosses 52 fit into bottom recesses 53, as best seen in FIG. 6e. Bosses 52 are suitably oriented, e.g., in diagonal mirror arrangement, to permit multiple boxes to be stacked with box fronts 22 aligned, or at 180° (ie with one box front 22 above or below another box rear 28). Lid exoskeleton 44, which is angled around lid lip 64 and underneath lid perimeter steel band 66, provides strength and security to lid 30.

Figure 6B:
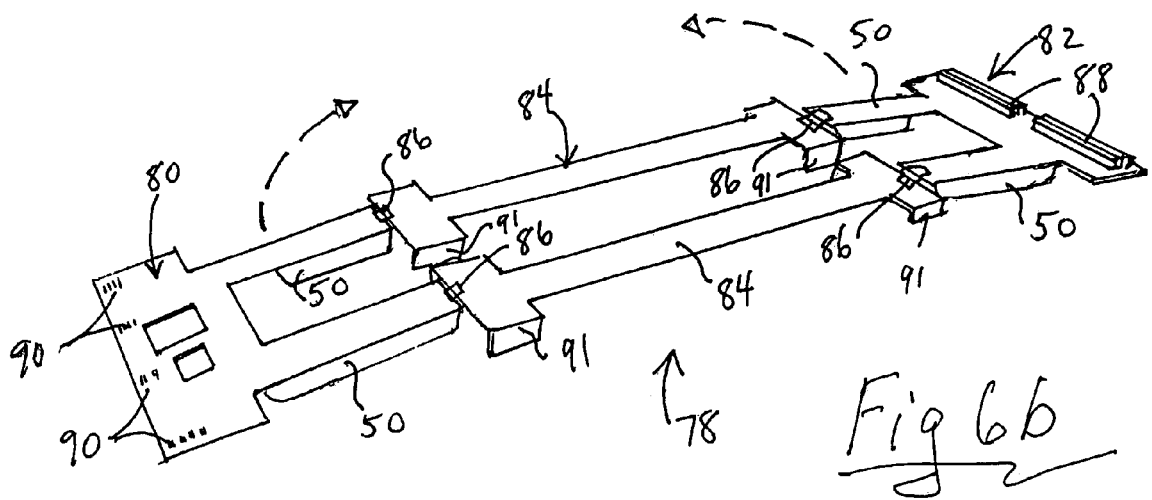
FIG. 6b is an isometric of the inventive container body hinged exoskeleton.

FIG. 6b is an isometric of the inventive container body hinged box exoskeleton 78, comprising front exoskeleton panel 80, bottom exoskeleton panel 84 and rear exoskeleton panel 82. When the molded plastic box is placed on bottom exoskeleton 84, exoskeleton hinges 86 permit front exoskeleton 80 and rear exoskeleton 82 to be pivoted upward into place, and bolted through the front and back side walls of the box (best seen in FIG. 9). Likewise, the bottom panel 84 is bolted through the floor of the box as seen in FIGS. 6e and 9.

Visible on front exoskeleton panel 80 are slots 90 for U-channel reinforcements 88, such as seen on the rear panel 82. Tabs on the U-channel pieces fit into slots 90 and are welded into place on exoskeleton (shown installed on rear exoskeleton 82 in this figure). These U-channels are located to fit into molded recesses 89 (shown in FIG. 6c) in smart container front 22 and back 28. Note the vertical channels 50, which provide reinforcement to the exoskeleton front 80 and back 82. The vertical flanges 91 on the bottom panel 84 frame the sides of front and back fork lift channels 36a, 36b formed by box feet 34 in box bottom 32 (seen in FIGS. 2 and 6e).

Figure 6C:
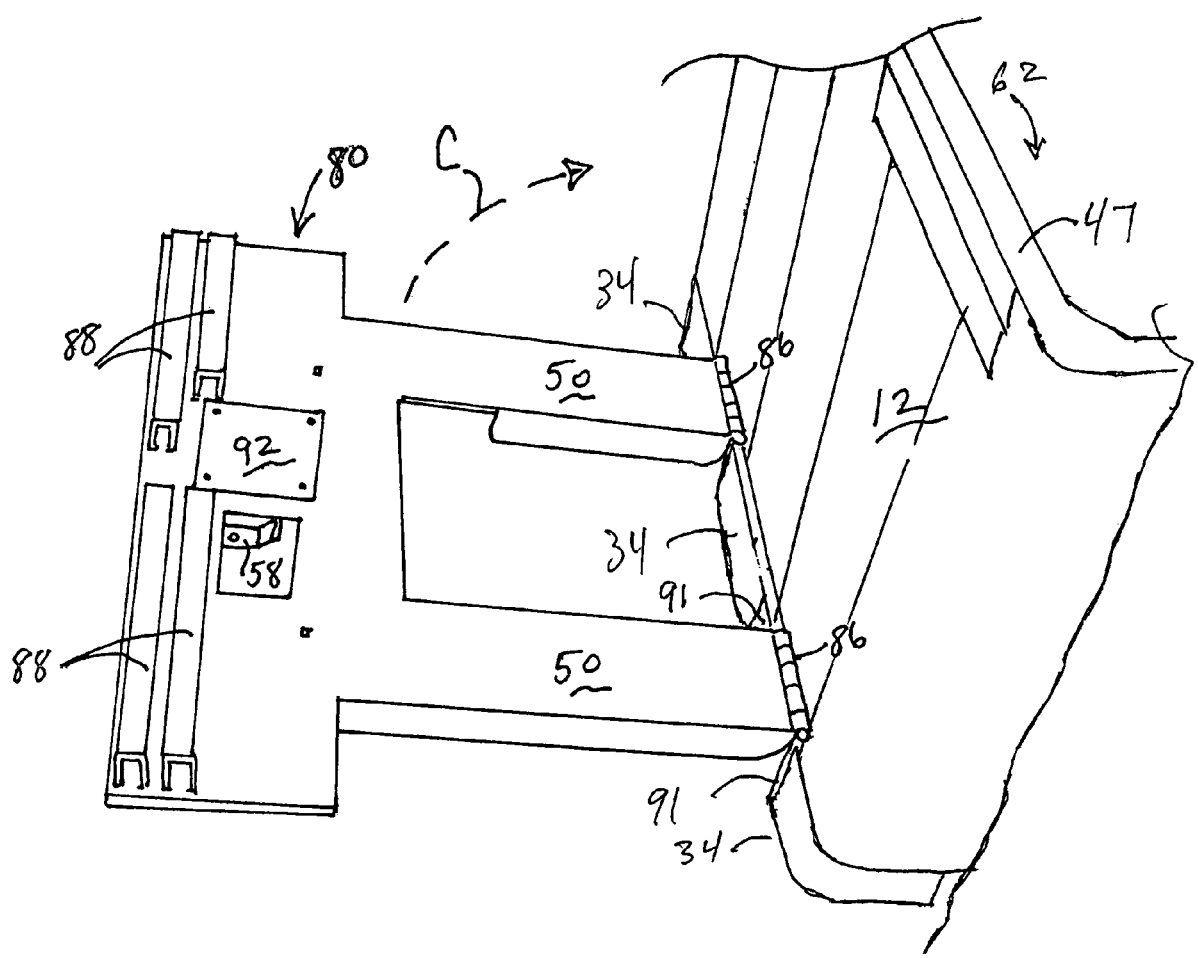
FIG. 6c is an elevated isometric view of the front section of the body exoskeleton before being raised and secured to the front of the box.

FIG. 6c is an elevated isometric view of the front section of the body exoskeleton panel 80 before being raised and secured to the front 22 of the box 12. Arrow C shows the pivot path of front exoskeleton panel 80. Visible in this figure is the rear access panel 92, which covers lock body 126 (best seen if FIG. 7d), and top lock key plate 58. Note that when exoskeleton 80 is in the raised position, U-channel reinforcement pieces 88 fit into molded recessed areas 89 in box front 22.

Figure 6D:
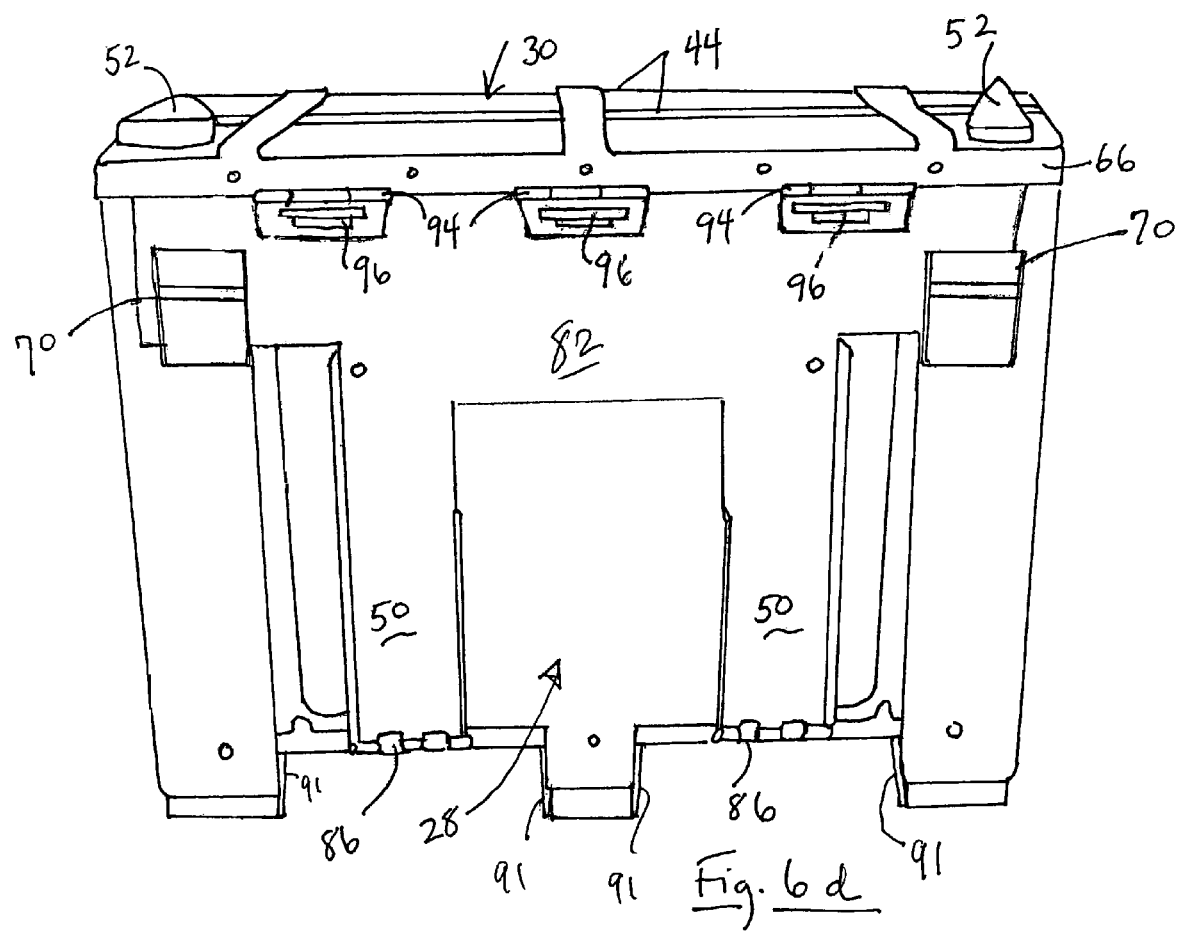
FIG. 6d is a back elevation view of the rear exoskeleton panel.

FIG. 6d is a back elevation view of the rear exoskeleton panel 82 installed on the box 12. Clearly visible in this figure are the rear hinge stops 96, which are in this embodiment angle brackets that retain box lid 30 in the upright, folded position described and depicted in FIG. 5. Hanger brackets 70 are used to secure smart container 12 in under-slung transport mode 14.

FIG. 6e is a view of the bottom 32 of the inventive smart cargo container showing the center (bottom) exoskeleton panel 84 and the stacking recesses 53 for receiving lid bosses 52 of a container 12 on which it is stacked. Between each pair of bottom feet 34 is forklift access 36 (from front 22 and back 28) and 38 (from sides 24 and 26). The bottom panel 84 is bolted to the box bottom by a plurality of bolts 98. The flanges 91 frame the narrow fork lift entries 36a, 36b front and back.

Figure 7A:
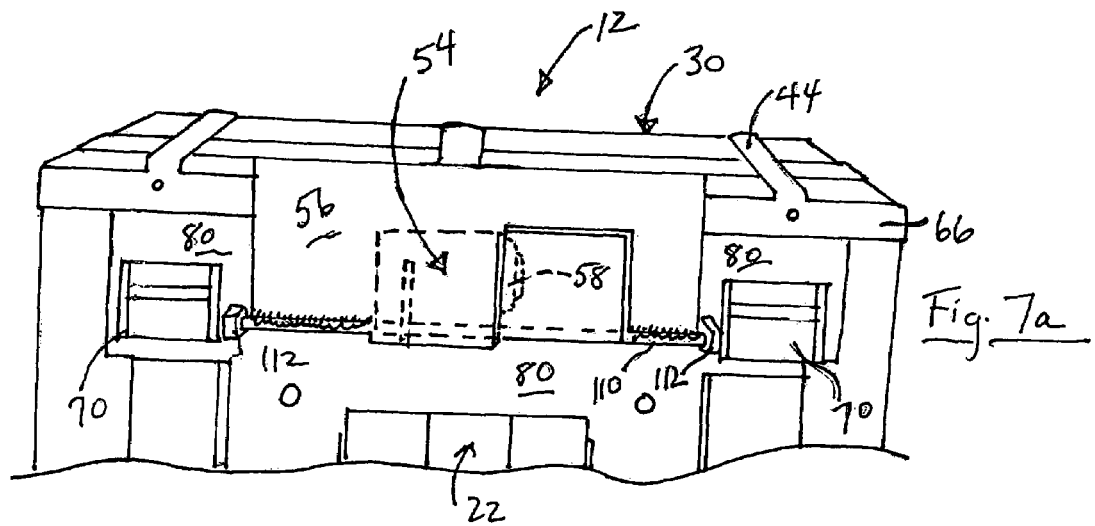
FIG. 7a is a partial front elevation view of the lid locking assembly in the raised, locked position.
Figure 7B:
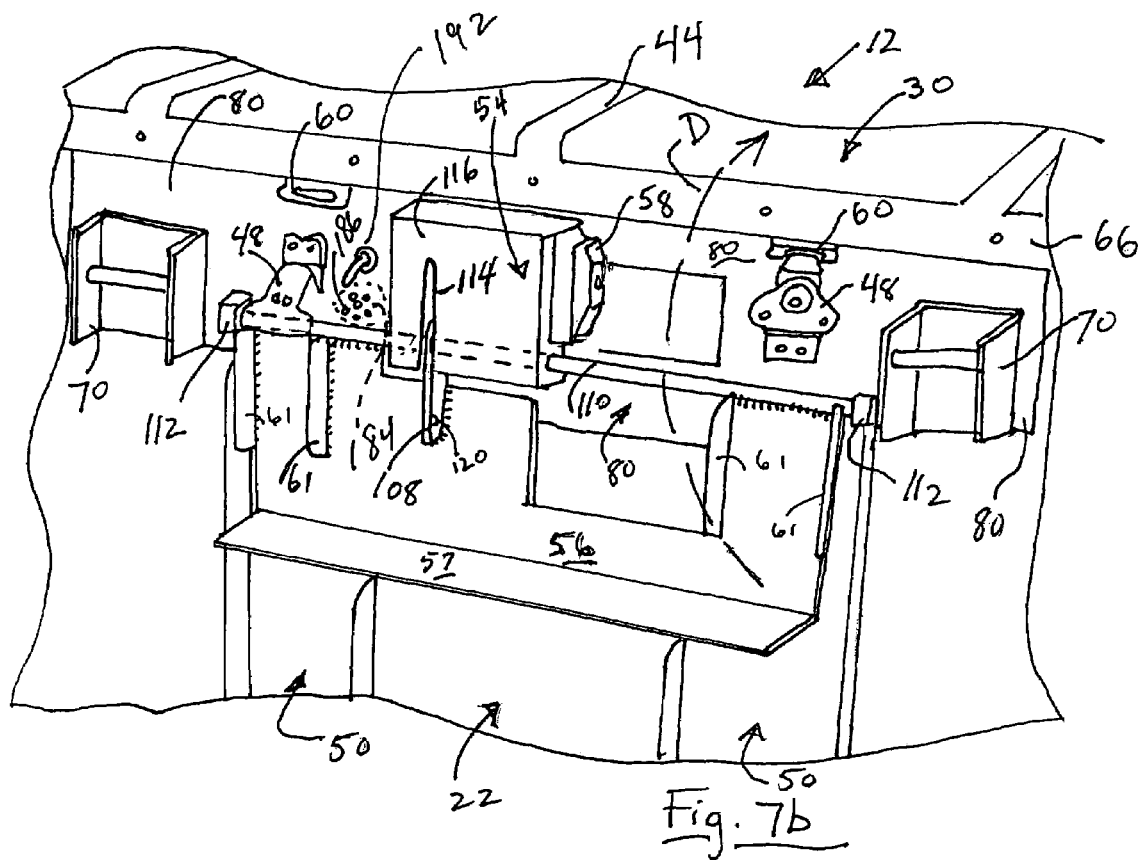
FIG. 7b is an isometric view of the lid locking assembly showing the flanged lock cover in the lowered, unlocked position.

FIGS. 7a and 7b are partial front elevation view of the flanged lock cover 56 in the raised and lowered position, respectively. The top lid locking assembly 54 is welded to this panel. Flanged lock cover 56 is welded to lock cover mounting rod 110, which rests in rod brackets 112, each of which brackets in turn is welded to front exoskeleton plate 80. Lock cover 56 is raised so that flange 57 (best seen in FIG. 7c) extends over lid lip 66 and lid 30 preventing access to electronic locking assembly 54 which can be clearly seen in FIG. 7b, which shows the lock exposed.

FIG. 7b is an isometric view of the lid locking assembly 54 showing the flanged lock cover 56 in the lowered, unlocked position, exposing lock housing 116. Arrow D shows the opening path of flanged lock cover 56. Now visible are rotary cam-type lid latches 48 and their respective tangs 60, which when engaged and rotated, cinch down lid 30, sealing lid seal 46 to lid lip 66 (see FIG. 4). Vertical flanges 61 form reinforcing channels in the lock cover 56, and secure both sides of each lid latch 48 against tampering.

Latch plate 108, which is welded to the lock cover mounting rod 110 and the lock cover 56 is now in the down position. However, when it is raised, its hole 120 engages the locking pin or plunger 122 of lock body 126 (best seen in FIG. 7d).

Figure 7C:
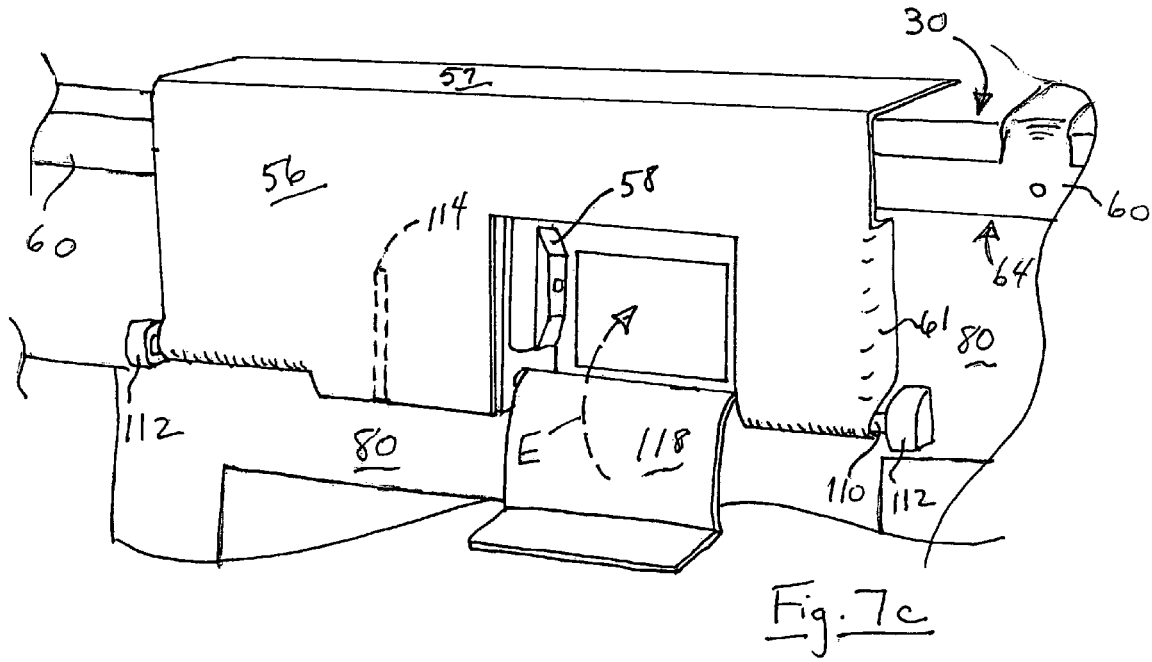
FIG. 7c is an isometric view of the lid locking assembly showing the flexible weather cover in the lowered, open position.

FIG. 7c is an isometric view of the lid locking assembly 54 showing the flexible weather cover 118 in the lowered, open position. Note flange 57 angled over the edge of lid 30. Flange 61 is shown preventing access to the cam-type lid latches. When locked, the only exposed portion of the lock assembly 54 is the lock entry 58, where the key is placed (see FIGS. 11a and 11b). To protect the lock aperture from weather, weather cover 118, made of flexible rubber or plastic polymer pivots into place when access to lock 58 is not needed. Weather cover 118 moves along pivot arrow E.

Figure 7D:
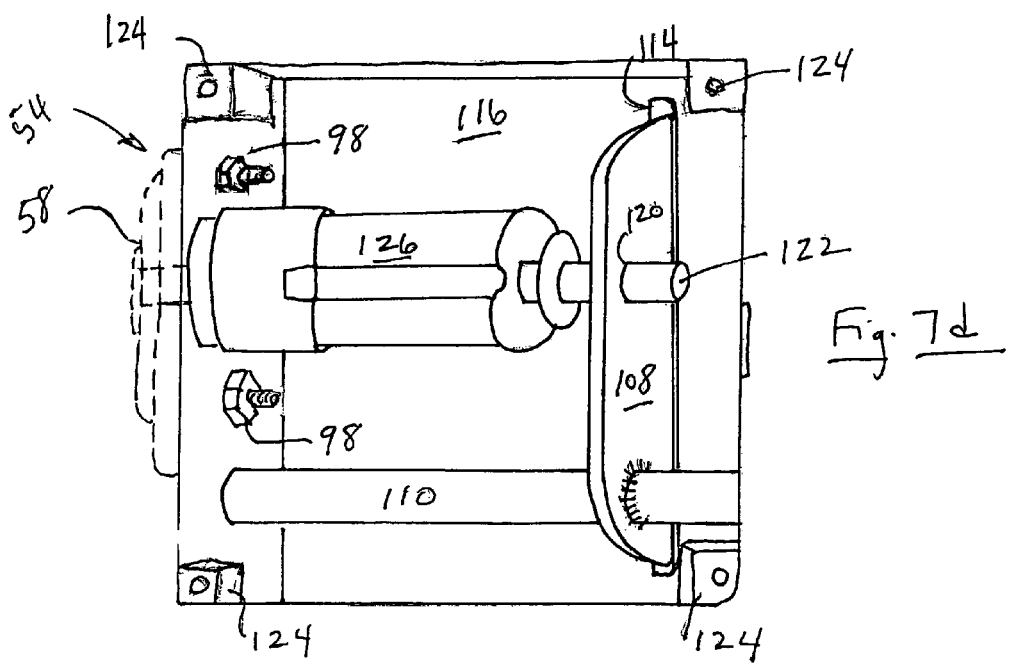
FIG. 7d is an isometric view from the interior of the lid lock in its housing engaging the latch plate in the locked position.

FIG. 7d is an isometric view from the interior of the lid lock 54 in its housing 116 engaging the latch plate 108 in the locked and upright position. In this view, lock rear access panel 92 has been removed (see FIG. 6c), revealing cover plate mounting blocks 124, and exposing lock body 126. As flanged lock cover 56 is moved into the upright position (see FIG. 7b), latch plate 108 (which is welded to lock cover 56) has been moved through slot 114. In the locked position, lock plunger 122 is extended through latch pin hole 120, locking flange 57 over the top of the lid 30.

Figure 8A:
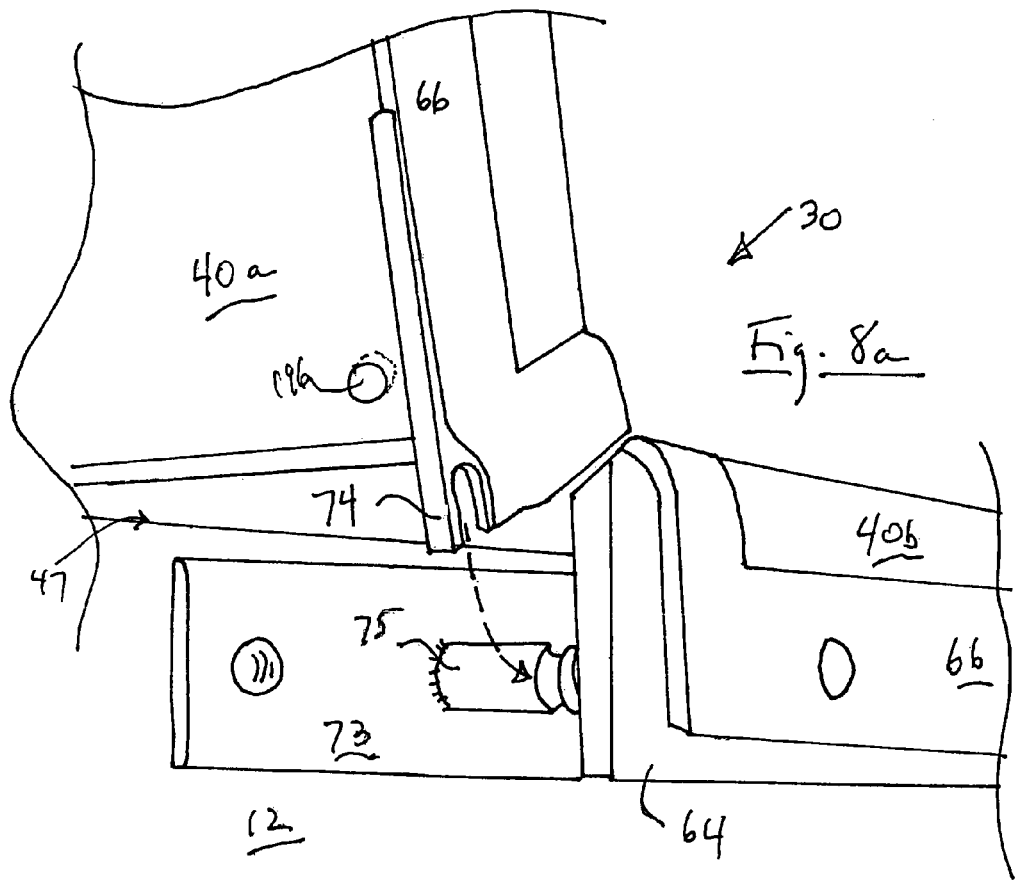
FIG. 8a is an isometric of the side, anti-pry lid latch showing how the notch engages the grooved locking pin.
Figure 8B:
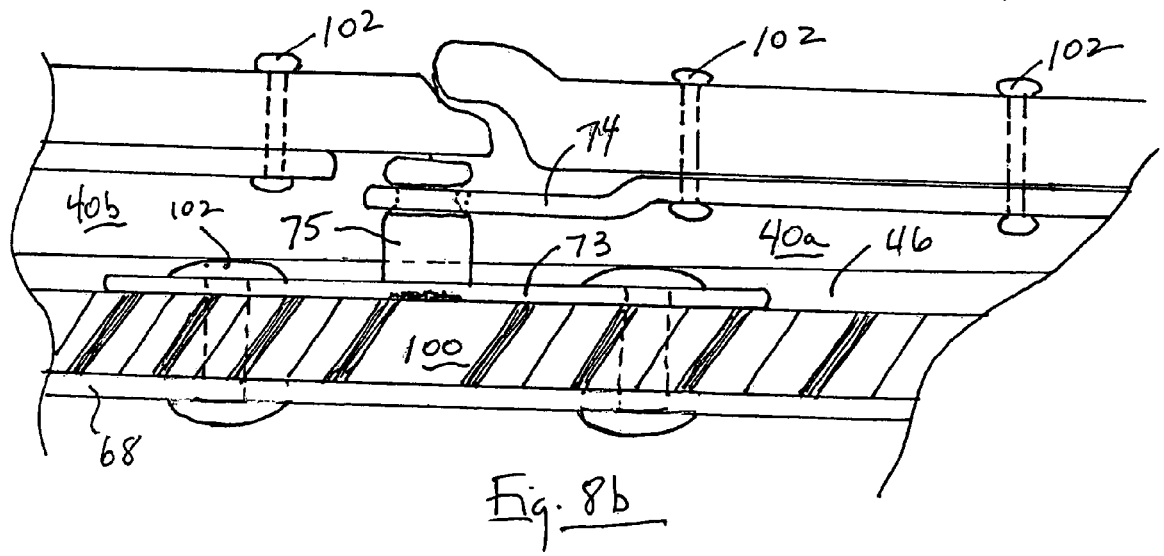
FIG. 8b is a bottom plan view, partially in section, looking upward at the side, anti-pry lid latch.

FIG. 8a is an isometric of the side, anti-pry lid latch 74 showing how the notch engages the grooved locking pin 75. Grooved latch pin 75 is secured (e.g. welded or threaded) to latch pin plate 73, which is riveted or bolted to box sides 24 and 26. This feature prevents the hinged lid 30 from being pried off. As lid front half 40a is lowered over box lip 47, notched latch 74 slips over the grooved anti-pry latch pin 75, securely retaining the center portion of both lid halves to box sides 24 and 26. This configuration is shown in a bottom plan view, partially in section, looking upward at the side, anti-pry lid latch in FIG. 8b.

FIG. 9 is an isometric of the body interior reinforcing plates 104 bolted through the box walls (28 is shown) to secure front and back end wall exoskeleton panels (front panel 80 is shown). Also visible is the interior reinforcing bar 68 along the inside top edge of rear wall 28, and bolts 98 securing bottom exoskeleton panel 84 to box bottom 32.

The electronics bay 170 for the inventive smart pallet-box cargo container is shown in the left front inside corner of the box 12 (the cover panel is not shown). From bottom to top is trickle charger 172, battery 174 and a combined RF transceiver/microprocessor unit 176, and GPS unit 178, the latter being located in a recess in the top lip of the box, which is covered by panel 180. This locates the GPS out of the way of shielding exoskeleton metal. Shown in dashed lines behind the trickle charger is a female outlet for the charger plug into external power supply. The male plug 20 for external power is best seen on the upper right in FIG. 2. The male plug 20 is wired to the female plug in the bay 70. The battery is trickle charged during warehousing, during transit or at its destination by plugging external 110 v power into the male outlet 20. The battery powers the remainder of the electronics. Although not shown in this figure, the battery/trickle charger system can also power the audio alarm (see FIG. 7b) and sensors 196 as needed. An optional, but preferred, red LED 182, seen from the outside in FIG. 2 and from the inside in FIG. 9, is also wired to the microprocessor and it lights when the system is armed. In addition, the molex connector on the bottom of the RF/microprocessor unit 176 includes a lead and connector 194 (see FIG. 9) to the side wall security screen array 128, best seen in FIG. 10a and 10b. Thus, when the screens are cut, the RF/GPS unit can signal out the event, time, and location.

It should also be understood that a wide variety of sensors 196 can be placed on the interior or exterior of the box top, bottom and side walls, or distributed inside the box cargo volume 62 and hard wire connected through a molex connector on the RF/GPS unit 176. Optionally, and preferably, the sensors 196 communicated their data outputs via short range RF to the unit 176 to signal their state, status or an anomalous condition. These sensors 196 may be powered by the battery 174. Preferably, sensors 196 include their own battery power (typically small hearing aid, watch or camera-type disc batteries) that provide enough power for years of operation. The sensors 196 can detect, among other conditions: intrusion; ionizing radiation and X-ray; sound; light color, contrast and intensity; ultrasound (US); infra-red (IR); electro-magnetic fields; current, voltage and resistance; humidity; pH; temperature, including absolute values, change and rate of change in temperature, including both external ambient and internal; motion, such as change of direction (inertial), acceleration and speed of travel; transient vibration, displacement, inclination and shock; pressure, weight, load and force, including absolute values, change and rate of change in values; and gases, fine particulates, fumes, chemicals and biologicals, by type and amount, such as gaseous CO, $CO_2$, $O_3$, $N_2$, $H_2$, or volatile hydrocarbons, e.g., smoke, propane or gasoline, explosives, Anthrax, Ricin, and Sarin, Chlorine, Bromine, Tabun, Soman, VX, Phosgene and Diphosgene, Chlorpicrin, Hydrogen Cyanide, Arsine, Agent Orange, or other immobilizing, irritating, incapacitating or lethal gases (including single components of binary, ternary or quarternary gas mixtures); and the like.

In addition, the sensors 196 can include snorkel tubes from the outside surface of the container 12 leading into totally encapsulated (sealed) sensors located inside the box or in the microprocessor unit 176. The sensors can be preset to sample parameters every one to 2 seconds up to once every several hours, and transmit updated and normal data in periodicity ranging from every 1-5 minutes or so to once per day, or only as changes or events occur. The periodicity and range of transmission may be adjusted to accommodate particular goods or conditions. Where there is no change, or the changes are within a predetermined acceptable range, the sensor can go into a sleep mode until the next programmed reading and transmission. In addition, the sensors can be polled and respond back with a reading upon request from the relay or RF/GPS or GSM unit to which they report.

As described, the sensors 196 can be distributed in or on the box, or can be mounted on the PC board of the microprocessor in control unit 176. The sensors sense conditions a predetermined value above or below a baseline value, compare and conclude that the sensed signal is an anomaly, relay that to the microprocessor in the controller 176 which in turn further analyzes the information and packages it with other data from other sensors and the GPS system and radios it out. The RF transceiver is a transmitter and receiver that relays the information to a designated site, such as a home base or service company server, typically via a paging network (950 MHz, or other FCC designated frequency). Where the truck has a master GPS system (GSM), the RF transceiver in the box can radio to it, which packages the sensor data with its GPS then-location data of the vehicle, and relays that to the server.

The RF/GPS or GSM units can also be programmed to alert the driver. As a working example, consider a refrigerated trailer in which the inventive smart containers or the truck cargo hold includes external ambient temperature sensors. In the case where the smart containers are loaded with heat labile biological materials, such as vaccines, laboratory specimens, fresh produce or the like, when an unpermitted temperature or rise in temperature is detected in the cargo hold, the containers can be polled via the transceiver to report back the temperatures inside the individual smart boxes in the hold. Where the temperature is high or the rise exceeds a predetermined rate, the driver or other attendant can be paged so he/she can check to determine if the back door of the truck has been left open or has come ajar, or can check the compressor to determine if it has failed. Likewise, the driver can be paged if one or more containers detects an anomalous condition at any time.

Short range RF (wireless) sensors of the type useful in the inventive smart container system, having frequencies in the range of from 308 to 916 MHz and a battery life of 3-5 years, are available from Radio Data Corp of Scottsdale, Ariz. They communicate via a sensing transponder (or the transponder has its own on-board sensors) as well as being able to receive transmissions from a Radio Data Corp Universal Sensing Transmitter (USST) and other external wired sensors or status indicators. It also has a micro-controller, a 916.5 MHz transceiver, a flash memory and a real time clock (for data storage) and either an RS232/485 interface or a USB interface. This can either connect directly to a GSM, GPS/GSM or GPRS unit or it can communicate (using the 916.5 MHz transceiver to a reader that can have an 802.11, 802.15, 802.16, GSM or other global communication link. The transceiver can also be used to send local alarm signals to a Radio Data Corp Key Fob Alarm that can be worn by the driver or attendant, thereby paging them. The transponder is a collector of multiple sensor transmitter signals and the reader is a concentrator of multiple transponder signals. Radio Data Corp also provides a Key Pad Poller which allows manually coded transmissions (or instructions) to be entered into the system via either the transponder or the reader (like a parking space or loading dock number) or it can be used as a load or door status indicator.

An example of an RF/GPS unit of a type useful with the controller 176 in the inventive smart cargo containers is a PADTAG unit available from PAD, Inc. of Longvalley, N.J., in which case the RF transmission is sent to and received by a paging or reflex network (950 MHz), and routed to a base station server. Each shipper, customer or other authorized tracker can access data on individual ones of the smart cargo containers or groups of them via a customer or user name and password on an SSL server webpage. The tracker can poll where the container is, and the location provided by the container's GPS/GSM unit will be displayed on a map. In addition, in the case of an anomalous condition being sensed, such as: unauthorized unlocking; attempt at tampering, entry or opening of the container; unlocking at an improper location; sensing temperature, humidity, chemical conditions, and the like, the system will wake up and emit an alarm, including audio, visual, sending of e-mails, faxes and phone calls, to a selected number and type of individual for response. The Radio Data Corp wireless sensors can be mounted on a Radio Data LITMIS daughter board mounted on the PADTAG controller board. An example of a commercially available GPS unit is an Earthmate GPS LT-20 unit, available from Delorme (delorme.com), or similar units from Garmin, Magellan, Lowrance and Philips.

It is preferred to include an audio alarm system in the smart container. As best seen in FIGS. 7b and 9, a battery-powered 90 DB audio alarm unit 184 is disposed in the front wall 22 of the container just behind speaker grille 186. This alarm is activated by simple magnetic or button type contact switch elements 188, 190, in the lid and top of the box wall, respectively, as best seen in FIGS. 3 and 9. A switch 192, see FIG. 7b, arms or turns the alarm off. In use, after unlocking the cover plate 56, the switch 192 is accessible, and is moved to the off position. Then the top 30 can be unlatched via cam latches 48 and opened. The circuitry is straightforward for the audio alarm, its battery, the NC magnetic switch, and the toggle switch, based on the principle that when the circuit is broken the alarm will sound.

It should be understood that the red LED 182, or a duplicate of it, can be part of the audio alarm circuit. Where two red LED's are used, when both are illuminated, it means both the RF/GPS system and the audio alarm system is armed. Instead of two red LED's different colors may be used, e.g., red for the RF/GPS system and blue, white or yellow for the audio alarm. In other embodiments, the inventive smart cargo container may include a number of externally visible status or condition LEDs, the function of which is signal status including at least one of an armed condition, an open condition, a battery low condition, an attention-required condition, a wrong location warning, and a breach or damage condition.

FIG. 1a is an isometric, partly exploded view of the interior of the smart cargo container 12 showing insertion and placement of the side and end wall security screens 128a and 128b. A suitable security screen of fiberglass mesh interwoven with spaced, 30-gauge Tefzel-coated wire strands is available from National Security Screen, of Woodbridge, Va. The security screen 127 is secured to the outside of thin, but tough, rigid plastic paneling 129, such as styrene or ABS. The screen halves are suitably sized and shaped to conform to the inside dimensions of load volume of box 62. Two halves, 128a and b are placed into the box and connected at one end with wire connector 132, so that any breach to the surface of the screen triggers the electronic security system which alarms, tracks and audits each specific container.

FIG. 10b is a section view along lines 10b-10b of FIG. 1a of the H-connector 130 that retains the interior security screen panels 128a and b. As an alternative to the hard-wired screen intrusion or wall-breach sensor, any suitable RF sensor can be used, such as one or more light or sound detecting sensor(s) capable of detecting cracks, drilling through the walls, cutting with saws, or the like. The RF sensor communicates to the controller which in turn reports the event.

Figure 11A:
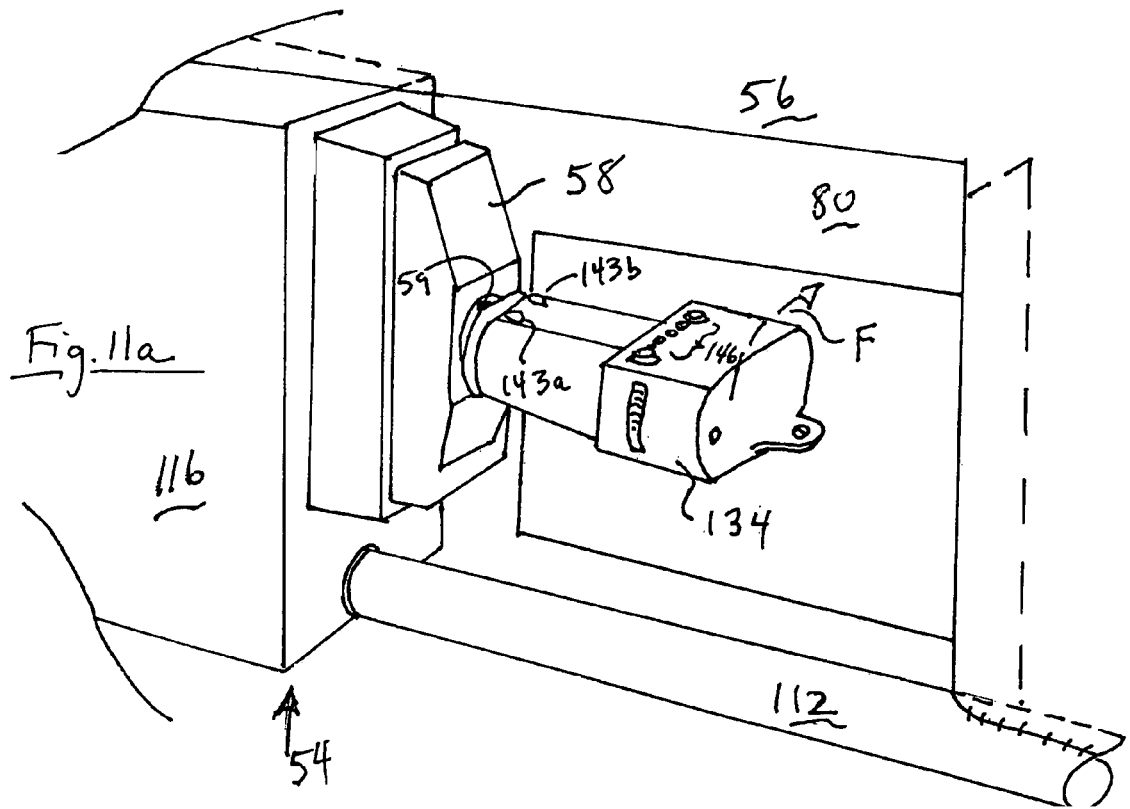
FIG. 11a is an isometric of the electronic key inserted in the lock aperture (keyway)
Figure 11B:
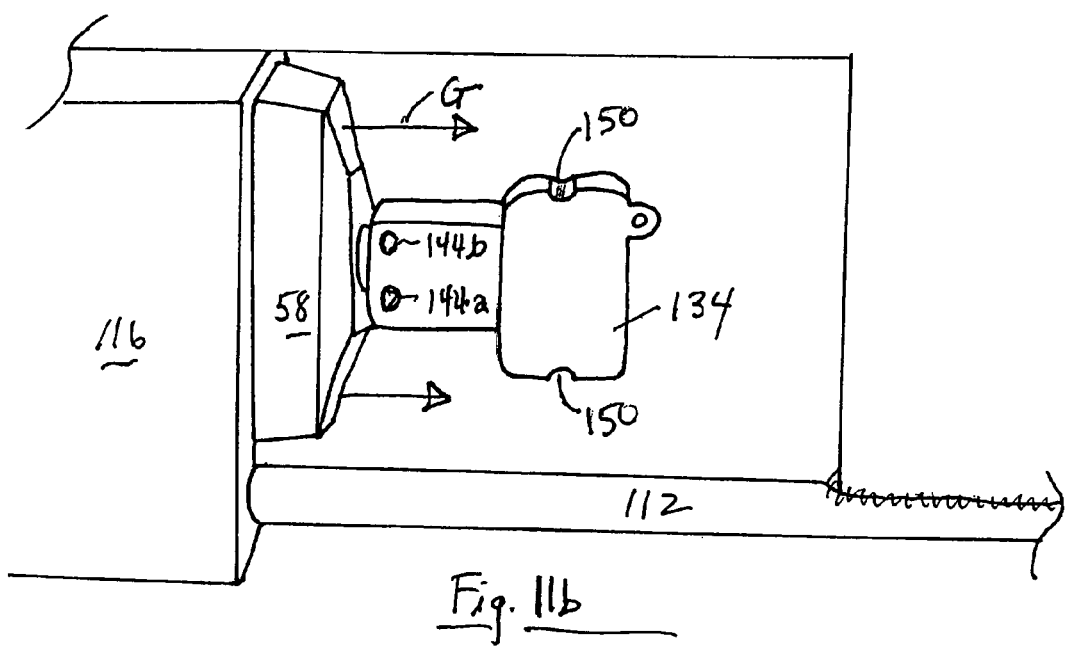
FIG. 11b is an isometric of the electronic key inserted in the lock assembly, and rotated into the "open" position to release the lock plunger.
Figure 11C:
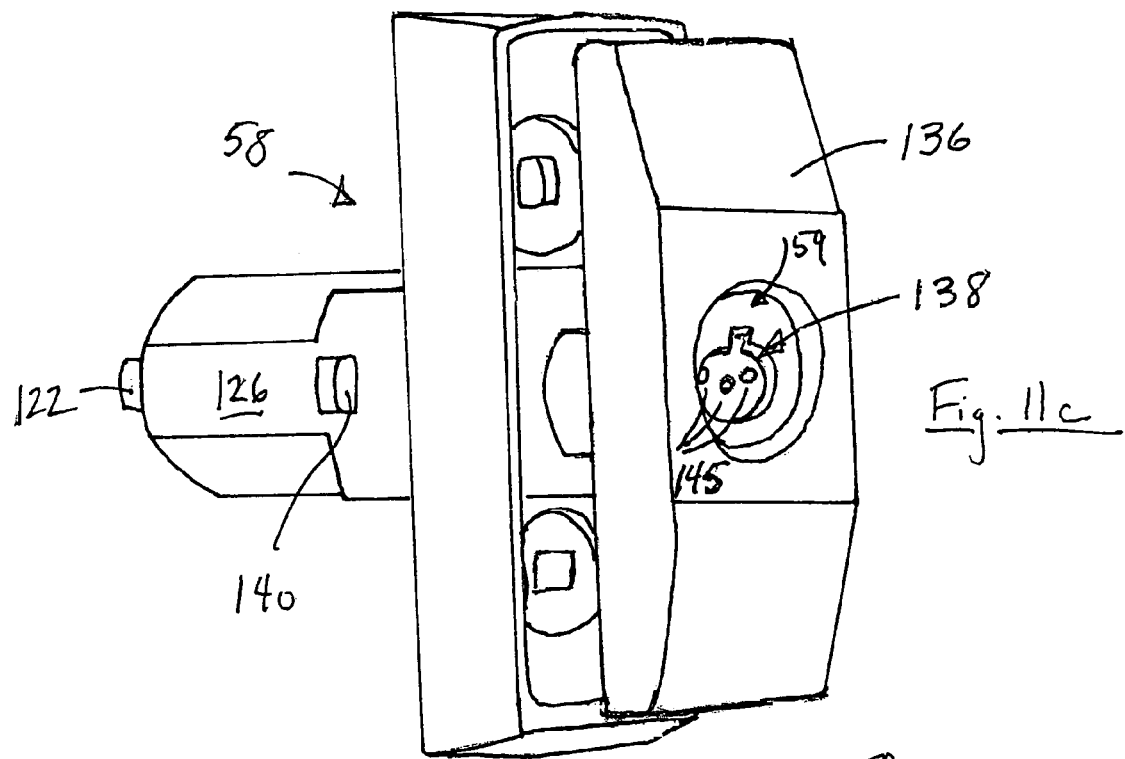
FIG. 11c is an isometric of the lock popped open upon turning the key as in FIG. 11b.
Figure 11D:
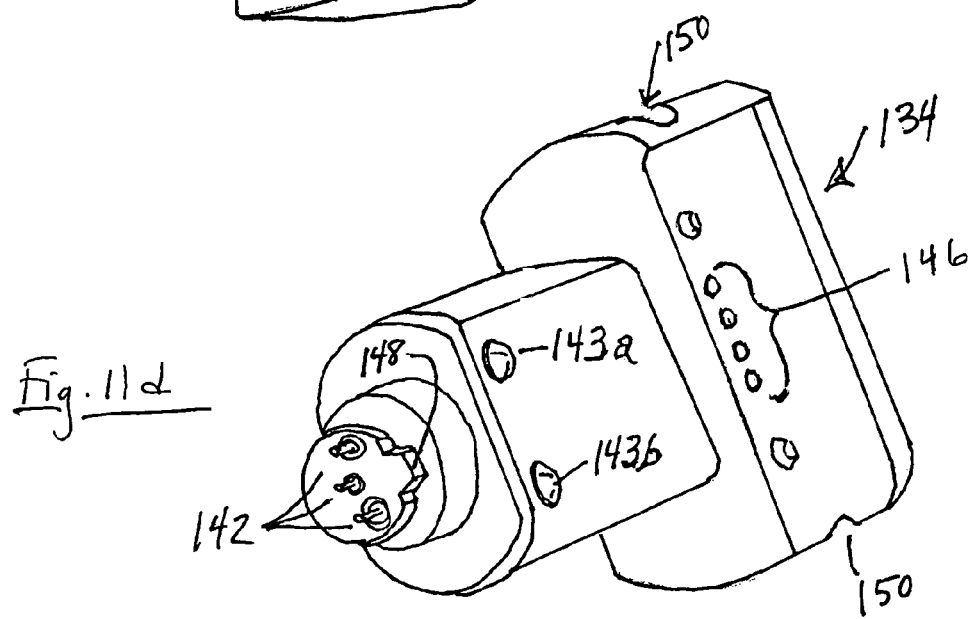
FIG. 11d is an isometric of the programmable electronic key showing the electrical contacts.

FIG. 11a is an isometric of the electronic key 134 inserted in the lock plate 59 (keyway). FIG. 11b is an isometric of the electronic key inserted in the T-handle type cylinder lock assembly, and rotated clockwise into the "open" position to release the lock cylinder carrying plunger 122 (see FIG. 7d). FIG. 11c is an isometric of the lock popped open upon turning the key as in FIG. 11b. FIG. 11d is an isometric of the programmable electronic key 134 showing the electrical contacts 142 which signals lock 58 when the properly programmed key has been placed in the key aperture 138.

Viewing this series of figures, upon insertion of key 134 into aperture 59, the key contacts 142 engage the corresponding contacts 143 of the lock. When the key code and lock code match, a green LED light 143*a* is illuminated and the key can be turned. If a red LED 143*b* lights up, the codes do not match and the access is not authorized, nor will the key turn in the lock. Assuming an authorized key code is matched, the key 134 it is turned along the path of Arrow F (the lock can be oriented so that the key has to turn either clockwise or counterclockwise, when viewed from the right side, to open). When turned, the key 134 releases catch(es) 126, and lock bolt or plunger release the T-handle 136 (best seen in FIG. 11*c*), is spring-biased to move outward along Arrow G (in FIG. 11*b*). That allows locking pin (plunger or bolt) 122 to be pulled out of latch plate hole 120 of latch plate 108. The lock is now opened and the lock cover 56 can be rotated down to provide access to the cam latches 48.

Note that only when the lock and key code match (green LED signaling match) can the tang 148 of the key be rotated to release the catches 126. Releasing latch plate 108 permits flanged lock cover 56 to open, which in turn permits lid latches 48 to be released for access into box interior 62. By way of example, a suitable electronic lock is the "NexGen" electronic high security lock system, available from Medeco Inc. of Salem, Va., USA, a division of Hillenbrandt Industries, Inc. The NexGen electronic lock provides access control, audit capability, route management and the physical security of a high quality mechanical lock. No hardwiring is required of the lock because it derives all of its power from the programmable key, which is battery powered to last for up to 4,000 or more audit events. The software system permits the user to program into the key, authorization who may open the lock and when they may do so. Upon download of data from the key, the software program provides detailed reports for complete security management, including all openings and attempted openings. Because the keys are electronically reprogrammable, locks and keys can be immediately rekeyed to replace lost or stolen keys. A single key can access up to 11,000 differently programmed locks, and each lock can store up to 2,000 audit events. While the electronic keys are currently available in four different styles, each is designed to be able to open T-handle cylinder, cam or padlock style locks. In the instant smart pallet-box cargo container, the T-handle type cylinder lock is preferably employed.

As seen in FIG. 11*d* the programmable electronic key 134 includes spring-biased protruding pin-type electrical contacts 142 which signal lock 58 when the properly programmed key has been inserted in the key aperture 138 (also known as a "plug face") to align with the respective shallow recess contacts 145 in the lock. As described, when electronic "recognition" between lock and key has occurred, the green LED lights, and when there is unauthorized attempt, the red LED lights. The side grooves 150 retain the key in proper orientation in the programming cradle (best seen in FIG. 11*e*), for programming (pre- and re-programming) key 134 via the contacts on the opposite side of the key, as seen in FIG. 11*b*.

FIG. 11*e* is an isometric of the hardware for configuring use authorizations and audit trail downloads of the electronic key of the inventive smart cargo container. Key 134 is resting in cradle 152, its cradle pin retaining grooves 150 aligning it to the cradle's pins 154. Programming contacts 146, seen in FIG. 11*b*, are not visible in this view, as they are on the underside of the key 134, aligned with programming contacts located in cradle 152. Programming is performed using a laptop or desktop computer 156, shown here with standard mouse 158 and monitor display 160. LED lights 144 (seen also in FIG. 11*b*), one red and one green, light when the programming is in process (red) and complete (green). Alternatively, the programming can be done by use of a hand held PDA or tablet computer. In addition, the red/green LEDs 144 can be amber/green or any other color combination, and can indicate the key is downloading the accumulated data from its memory and download complete, or the like suitable code.

The electronic locks have a hardened steel shell (the body 126, bolt or plunger 122, release T-handle or head 136 and plug face 138 as shown in FIG. 11*c*), and the keys electronically record in included memory (for example, flash memory) on the order of thousands of separate auditable events, including at least one of: opening attempts; failure to open; positive open events; time of event; and the duration that the lock is in the open state. In addition, the keys can be programmed at home base (see FIG. 11*e*), or in the field by laptop, PDA, cell phone (including Blackberry or Sidekick) and the like devices, and the programming configuration code can be provided from a remote center to the programming cradle driving device (laptop, PDA, cell phone, etc.). The keys can be programmed to open locks only within specified time parameters. Each key is uniquely identified, both electronically and by bar code strip on the side or face of the key, so that they can be issued on a restricted basis to only authorized personnel, and they can be accounted for. When the key is inserted in the lock, the lock memory can download to the key, so that upon putting the key in the programming cradle the lock history data can be downloaded to the computer system for analysis and reports.

The electronic keys useful in the inventive smart box, need not have physical contacts as in the above described, non-limiting example, but may be activated via a RFID system to provide the key/lock recognition/authorization functionality permitting the key to be rotated in, or otherwise open, the lock. In addition, the lock may contain within its body 126 or within the housing 116*a* flash memory drive to record a wide variety of events related to the lock, such as the ones enumerated for the key, or the condition status of the box.

In another important alternative embodiment, a GPS unit is incorporated in, or electrically connected to the lock or the key to provide a second level of access control, in that the lock is programmed so that if it is attempted to be opened at other than a pre-determined, pre-programmed destination, the lock will not open. Thus, upon the key being inserted in the lock, the then-GPS coordinates are checked and compared to the programmed location in the memory of the key or lock, and if they compare, the green LED lights or flashes and the lock can be opened. As in the above example, if the coordinates do not compare within a preselected margin of error, e.g., within the accuracy of the GPS unit (within a few feet), the lock will not open. In either event, the history record will be stored for future download, or real time reporting by RF, e.g., Pager, Cell Phone, Bluetooth or other wireless network. Thus, the unauthorized event can be reported in real time to on site, near-by local, regional or distant location, by direct RF, or via RF to a local WAN or LAN wireless (e.g., 802.11-type) router that communicates via the Internet to a server at the shipper's, customer's, or security service (including governmental, military or law enforcement) headquarters or service center for appropriate action.

Figure 12A:
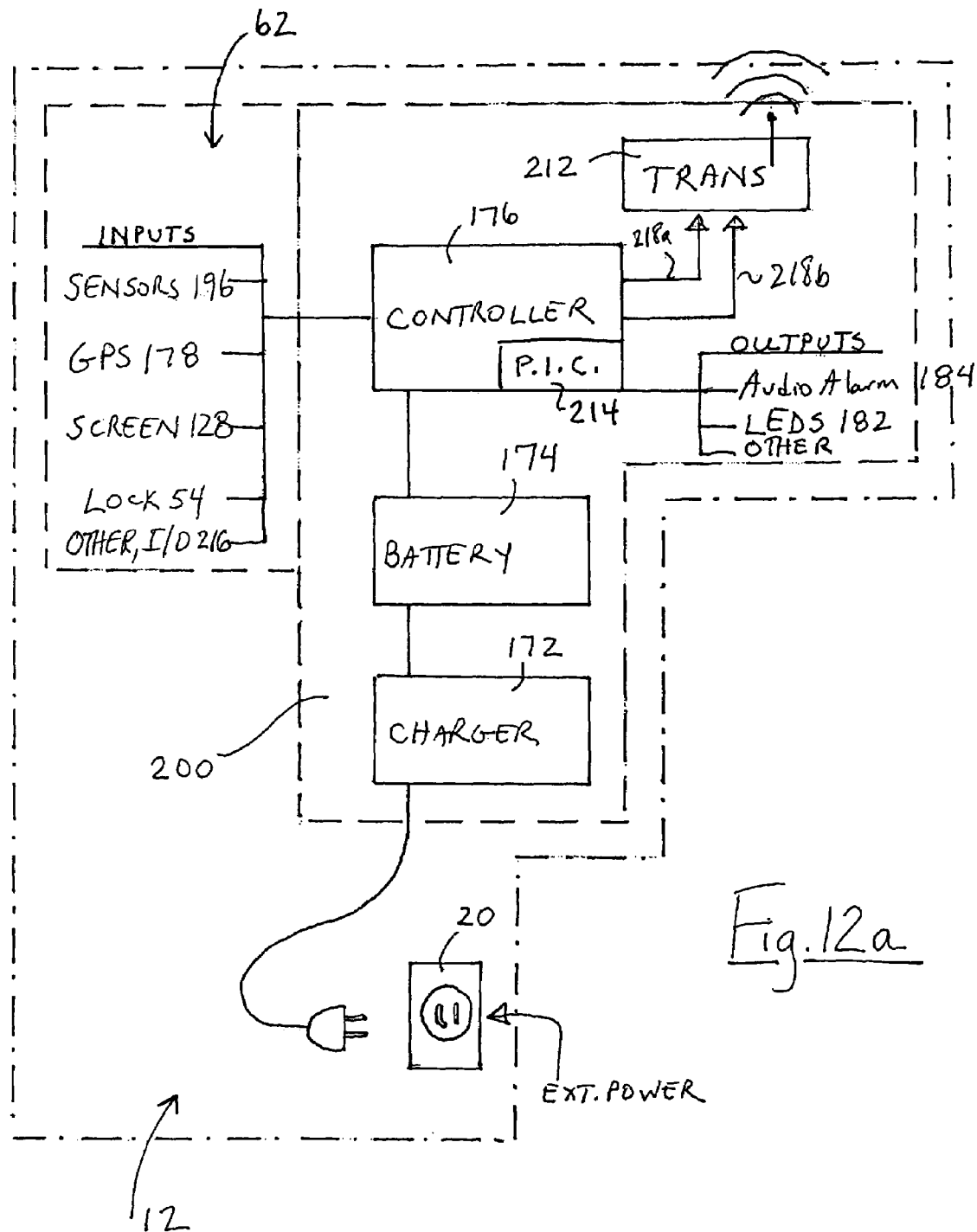
FIG. 12a is a schematic block diagram of the architecture of the controller and data communications system as employed in the inventive smart cargo container.
Figure 12B:
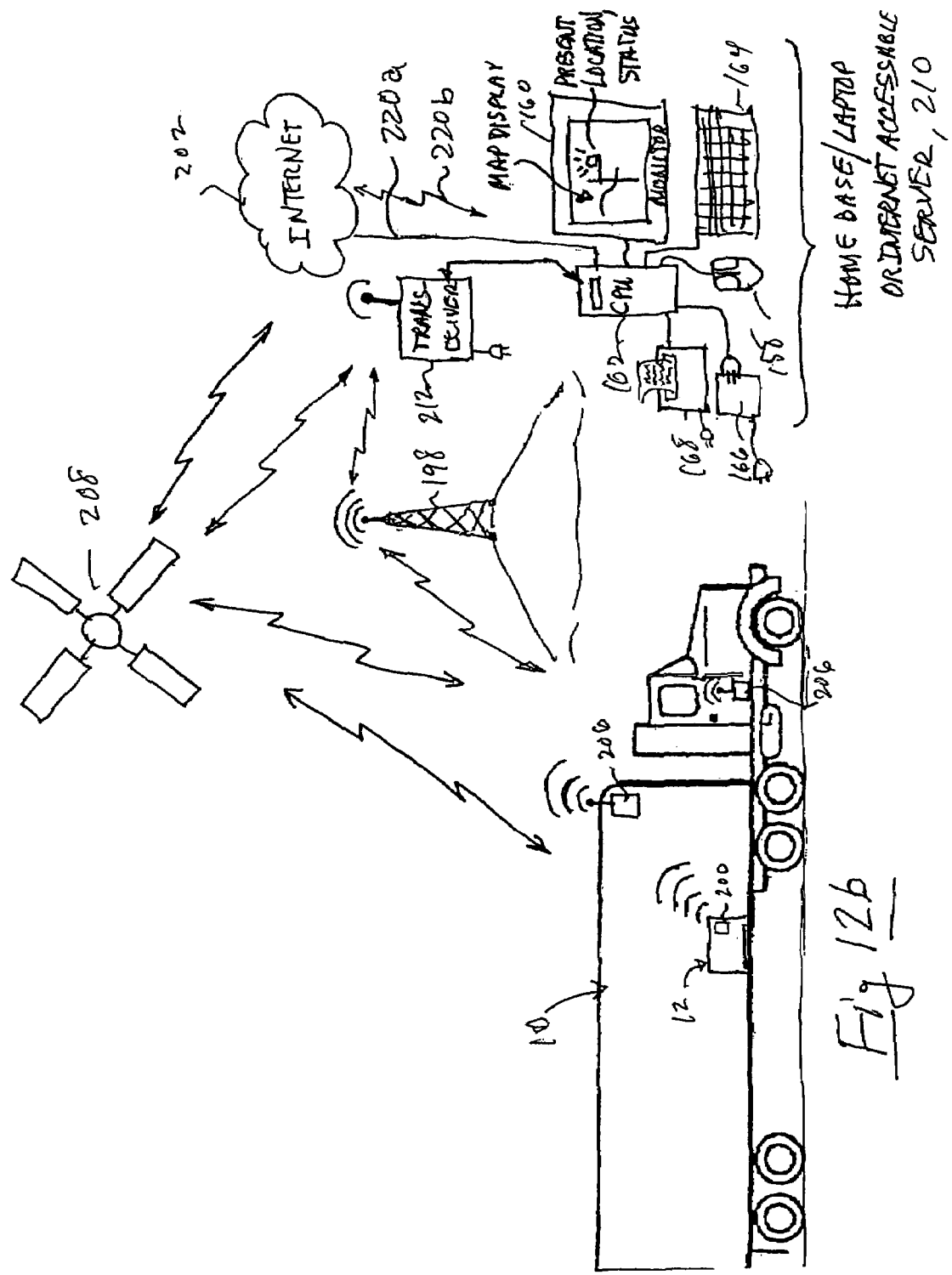
FIG. 12b is a schematic of the system and operational architecture of the remote electronic tracking and security reporting by the inventive smart container.

FIG. 12*a* is a schematic block diagram of the architecture of the controller and data communications system as employed in the inventive smart cargo container, and FIG. 12*b* is a schematic of the system and operational architecture of the remote electronic tracking and security condition reporting by the inventive smart container. The smart container data communication and management system includes sensors, locks, alarms, container armed status lights, data encoders, transmitters and/or transceivers, computer programs, data bases, and related equipment to enable activation, coding, decoding and use of the data communications system, including real time and past history display of status and location, and management and operation report generation. The inventive smart cargo container monitoring and management electronic data communications system includes container-mounted components 200, separate remote signal relays (towers 198, satellite 208), monitoring station components 210, and auxiliary equipment including locators (GPS locators) 178 and locking systems 54. The home base monitoring station 210 includes a computer system having a CPU 162 in which is loaded data engine, display programs and web server or web browser programs to enable activation, operation and use by customers of the data system.

As seen in FIG. 12a, the container 12 includes a communication module 200 which comprises a programmable Peripheral Interface Controller (PIC) 214 mounted on microprocessor controller board 176, a battery 174, a transmitter or transceiver (transmitter/receiver) 212, trickle charger 172 connected to the external power via outlet 20, and a wide range of inputs (lock 54, security screen 128, GPS 178, sensors 196) as well as I/O ports 216 for configuring the programmable PIC by computer, and outputs including selected frequency command signals for short or limited range RF broadcast 218a (e.g., to a master GSM, transponder, transceiver or repeater, unit in the truck, warehouse or via a reader as the truck passes a way station), or longer/full range RF broadcast 218b (e.g., to pager or cell network towers or satellites) audio alarm 184, status LEDs 182, and others, 216. The container location and status data can be sent as text, and can include a time stamp. The PIC can conserve battery use by turning the radio on just before a transmission will be sent, and can be configured to transmit a ⅓ second position burst after container data input, or to send container status/condition data on command from home base or at cyclic intervals. The PIC operating parameters are stored in its internal EEPROM that is configured from computer system 162 at home base 210, and will persist even when power is removed.

The remote monitoring aspects of the invention provides a method for shippers, customers, and security/audit personnel to monitor from a single "home" base, many containers simultaneously, the number ranging easily in the thousands. Under the inventive system, the tracking personnel can be notified and check when anomalous events occur and can have a complete handling report for each container from empty before loading to empty upon unloading at its destination, and with confidence in the security of the container along the route, including in the transport vehicle (truck, ship, rail, aircraft), in its origination facility, warehouses or transfer depots along the way and to destination unload or storage.

The inventive security system provides a unique identifier for each container in the field that is radioed to home base when the container is first put in use. Each container is pre-configured at home base (e.g., home warehouse, customer or shipper facility, manufacturing facility or the like), or in the field via the PIC program with a unique identification number or other data (name of customer, shipper, type of goods permitted to be shipped, etc), and its cycle of time for status reporting is pre-selected at that time. After loading and closed, it is initialized or enabled, and thereafter the container reports its status, the time, or/and location back to home base on the predetermined timed cycle, e.g., every half-hour, more frequently at night, less during the day, etc.), or to pollers (very short range, long-life battery powered microprocessor-controlled RF transmitters that are placed at various sites around the warehouse, storage facility or customer location), or readers (long range, 100-1500' depending on antenna) transceivers with the ability to receive an interpret the data from the container transponders and then forwarding this information by wired or wireless communication to a computer or computer network for real time location and status data retrieval from the containers). The program at home base displays a map from the map program with each container or group of containers located thereon with a unique icon, and the status can be indicated in text or change of icon, e.g., by animating the icon, changing color, flashing, change of text, combinations of them, and the like. In addition, an audio alert signal can be emitted on the computer speakers when the sensor or lock detects an anomalous event or unauthorized, untimely, or wrong destination attempts to open the container occur.

The inventive computer-enabled smart cargo container system permits complete management of the container security during transport, storage, loading and delivery, as a business, including communication via the Internet of container status and event reports, orders, billing, e-mail communications, and the like. In addition, the status reports of each container can be viewed and printed out for analysis, or can be computer-analyzed to show status and anomalous events, including access opening and locking, related by time of day, customer, shipper, by location, and the like. The accumulation of container handling data for a particular site, particular customer, particular shipping line, particular type of goods, and the like, over time can also be analyzed to reveal changes in commerce, types of events, patterns of attempted theft or damage, reduction in theft, and the like.

The inventive communication system includes provision for a wide range of inputs for any given container or type of goods being shipped or stored therein. That is, the PIC can accept a variety of sensor inputs, both interior of the container and external to it, by placement of appropriate sensors that are well known in the art and commercially available. For example, IR and US sensors, microphones, bolometers, thermometers, humidity, pressure, and surveillance optics (some as small as coin sized) are readily available. Following the principles taught herein, one skilled in the art will easily be able to mount any selected sensor(s) and hook them to the PIC for transmission of the sensed data back to home base for display or storage in the computer database. In the embodiment(s) in which a transceiver 212 is mounted in the container, the home base can selectively poll individual sensors for readings, or the PIC can be programmed to provide selected readings on a timed cycle. For example, upon receipt of a signal from the security screen 128 that it has been breached, or from the magnetic sensors 188, 190 that there has been an attempt to jimmy the top of the container, the PIC can be programmed or a signal can be sent from home base to turn on a microphone and/or camera to ascertain more data about the event, or to collect law enforcement or prosecution evidence.

Typically, the RF transmitter 212, or the truck-mounted master GSM unit, transponder, transceiver, or reader 206 in the cab or in the trailer (see FIG. 12b), sends a data burst lasting less than a second and is only powered when sending; that is, the transceiver 212 is OFF until the programmed PIC 214 sends a wake-up signal (power enable signal) to the transmitter for the transmit burst. The PIC is preferably configured to send an event occurred signal immediately upon the event, rather than wait for the next cycle. The PICs of different containers in a given cluster, e.g., warehouse or truckload, are preferably configured with different cycle send-times so that no two containers send simultaneously to home base.

By way of example only, since the bursts typically last less than a second the theoretical number on a single frequency is 3600 repeated hourly, but typical is every 30 minutes for 1800 container capacity. It is also possible to set the container comm module 200 to repeat the burst in time-spaced intervals, say once each 5 seconds for 3-6 tries, so 1 minute spacings between different container reports is more typical. As an alternative to the pager network frequency of 950 MHz or cell phone frequencies (any one of the quad mode frequencies available worldwide), a useful RF frequency is one of the no-license required frequencies of 154.600 MHz±5 kHz (Green Dot), and 154.570 MHz±5 kHz (Blue Dot). However, dedicated licensed frequencies can be obtained for use through an FCC-licensed Frequency Coordinator. Thus, different containers of different customers or shippers can communicate by different frequencies, so the real-time monitoring of thousands of containers simultaneously is entirely feasible under the inventive system.

As shown in FIG. 12b, the transceiver/transmitter-containing in-container module 200, or the in truck transmitter/repeater/reader 206 can transmit to tower 198 or satellite 208. In addition, they can receive as well from either of them, including the GPS coordinate system via satellite 208. The transceiver 212 of home base 210 receives the signals, processes them as described above and displays the text data or map data on monitor 160, or prints a report on the printer 168. The system is interactive via peripheral input devices, such as mouse 158 and keyboard 164. In addition, the CPU or server 162 (in the case where home base is a tracking service center server) can communicate via hard wire (DSL, fiber, cable, etc) 220a or wirelessly 220b to the Internet, to access by browser or serve pages that are accessible by the service center customers, e.g., shippers, customers and security service and tracking personnel. That is, the home base of a customer does not need to have a transceiver for direct receipt of the reports. Rather, the customer can access a service center site, enter a customer number and password, and then be served and have access to pages on which that customer's container status and history reports and present location maps are displayed. In addition, the service center can automatically enable event alerts by e-mail, fax, or telephone to the customer. The service center can also alert the driver or vehicle/warehouse attendant(s) to check as events occur and warrant. The receiver in the container can be interrogated (polled) from home base requesting reports of available data.

The computer system 162 is powered by AC or in the case of a laptop or PDA, by a suitable battery. The computer system at home base (or a portable, such as a laptop or PDA) is loaded with suitable operating system, applications programs, Internet browser(s), image transfer and e-mail programs. By way of example, a packet engine program and an APRS program with map data are employed to decode the RF transmission from the containers in the field, and to display the location, identification and status (at identified time/date stamps) of each container, as well as set the parameters for reporting the container status on a timed cycle. A suitable software-only packet engine is the AGWPE program available as shareware (for a contribution license fee) from www.raag.org/sv2agw/pepro.htm, which permits receipt of the data from the receiver 212 directly into the sound card of the computer. Alternatively, a packet modem can be used to convert the receiver 212 signal to digital data for input to the serial port of the computer system 162. The AGW Sound Card portion of the AGWPE program permits tuning the audio signal, permitting setting of the volume and squelch of the input signal from receiver 212, in cases where audio alerts of anomalous events is desired.

A suitable display driver for the map display feature of the inventive system is an APRS application program, available from www.winaprs.org. These programs are available in Windows, Mac and Linux operating systems, as WinAPRS, MacAPRS and XAPRS, respectively. These two programs function as the interface that takes the data from the sound card or the packet modem into the packet engine and the APRS places the trap location/status data on the map program.

Any suitable map data that interfaces with (becomes embedded in) the selected APRS program is used to provide map images. Suitable sources of map data includes: Tiger Maps, which is Census Bureau map data available from www.census.gov/geo/tiger/. Other sources are US Geological Survey, NASA, Delorme maps, Microsoft MapPoint and Microsoft Streets and Trips.

In addition, the computer system can be configured to communicate via the Internet 202 selected data for operation of the container security system as a computer enabled Internet-based business. This includes reports, communications and billings to remote clients or associates, franchisees, regulatory agencies, law enforcement, shippers, customers, and the like. It permits a central home office to communicate with regional offices or remote warehouses or shipping depots. Local, regional or national "views" of shipping and container security activity, such as the real time shipping loading, unloading, access and sensor events, can be communicated automatically to the remote home offices, permitting a nation-wide management operation.

Thus, the computer-enable Internet system of this invention includes a base station including a transceiver for receiving RF signals from the smart cargo container RF transceiver, and a computer system including: a web server for securely serving pages to clients and a CPU and memory that includes operating and applications programs that receive, analyze, serve and save, in at least one database structure, time-related and real time security status and location data from a plurality of said containers, including pages having annotated map information of the container identification, map location and movement and event alerts; and at least one client smart cargo container monitoring computer system that includes a CPU, memory, at least one display, and input/output peripherals, said CPU and memory including operating and applications programs that cause the client computer system to access the Internet and receive web pages served by the service bureau base station server upon entry of client authorization data, these web pages including at least the real time and time-related security status and location data about containers for which the client has authorization to monitor, in graphical or text format.

The computer systems of either or both the tracking service server or the customer can include a database of the history of handling of each container tracked and serves that history to the client upon request. This history includes at least one of: a unique identifier for each container; opening attempts, times and durations; personnel authorized to open a container; electronic lock configuring information; handling locations and times comprising shipping and storage events; anomalous events sensed by container sensors; ownership of each container; identification of shipper and customer for each shipping and storage period; nature or type and amount of goods shipped or stored, and the times and periods involved, and the like. That is, any history deemed relevant by the customer can be harvested, stored in a database, retrieved and displayed.

INDUSTRIAL APPLICABILITY

It is clear that the inventive smart pallet box cargo container provides a commercially significant system for better security and handling history and real time tracking of sealed containers for transportation, and especially for long haul trucking, and at the same time provides for improved security of the goods being shipped, thereby reducing damage and theft losses during transport and warehousing. Either advantage alone is both substantial and important to the shipping industry, and of great significance to the manufacturers and shippers of goods in commerce. The smart cargo container, in being unitary, that is, in not having loose parts that can become lost or non-functional, provides additional advantages for commerce. Further it permits the possibility of direct selling out of the box, without the need for intermediate packing in cardboard cartons.

As such, the inventive smart cargo container for shipping and warehousing is applicable to all industries involved in transport and warehousing of goods, especially high-added-value goods, such as pharmaceuticals, consumer electronics goods (computers, home electronics, etc.), electronic parts (computer components, chips, memory boards), entertainment products (such as CDs, DVDs and Video Tapes), and goods requiring high security transport (such as pharmaceuticals, mail, biological specimens, proprietary information) and the like.

It should be understood that various modifications within the scope of this invention can be made by one of ordinary skill in the art without departing from the spirit thereof and without undue experimentation. For example, the containers may have more or less than 4 walls or have the particular geometric footprint shown. Thus they could be round. Likewise, the containers can be modified for special lifting modes, such as side or top hooks or recesses for handling by other than forklifts from the bottom. Thus, the feet for forklift access are not an essential limitation of the invention. This invention is therefore to be defined by the scope of the appended claims as broadly as the prior art will permit, and in view of the specification if need be, including a full range of current and future equivalents thereof.

PARTS LIST

| | |
|---|---|
| 10. | Truck |
| 12. | Smart Container |
| 14. | Under-slung Mode |
| 16. | Trailer Undercarriage |
| 18. | In Trailer Mode |
| 20. | Power Plug |
| 22. | Front of Pallet Box |
| 24, 26 | Side of Box |
| 28. | Rear (Back) of Box |
| 30. | Lid (Top) |
| 32. | Bottom of Box |
| 34. | Feet |
| 36 a.b. | Fork Lift Access |
| 38 a.b. | Fork Lift Access |
| 40a.b. | Lid Halves |
| 42. | Hinge at Center of Lid 40 |
| 44. | Lid Exoskeleton |
| 46. | Lid Seal |
| 47. | Box Lip |
| 48. | Lid Latches |
| 50. | Vertical Channels |
| 52 a.b. | Stacking Bosses in Lid Top |
| 53 a.b. | Stacking Boss Recesses |
| 54. | Top Lock Assembly |
| 56. | Flanged Lock Cover |
| 57. | Flange |
| 58. | Top Lock Key Plate |
| 59. | Lock Aperture |
| 60. | Lid Latch Tangs |
| 61 | Lock Cover Vertical Flanges |
| 62. | Load Volume of Box (Interior) |

-continued

PARTS LIST

| | |
|---|---|
| 64. | Lip of Lid |
| 66. | Lid Perimeter Steel Band |
| 68. | Interior Reinforcing Bar |
| 70. | Hanger Brackets |
| 72 | Recess for Security/Tracking Electronics (Optional) |
| 73. | Latch Pin Plate |
| 74. | Lid Anti-Pry Latch |
| 75. | Grooved Anti-Pry Latch Pin |
| 76. | Rear Lid Hinges |
| 77. | Reinforcing Strap |
| 78. | Box Exoskeleton |
| 80. | Front Exoskeleton Panel |
| 82. | Rear Exoskeleton Panel |
| 84. | Bottom Exoskeleton Panel |
| 86. | Exoskeleton Hinges |
| 88. | Exoskeleton U-Channel Reinforcement |
| 89. | Molded Recesses for U-Channel |
| 90. | Slots for U-Channel Reinforcement |
| 91. | Flanges |
| 92. | Lock Rear Access Panel |
| 94. | Rear Lid Hinges |
| 96. | Rear hinge Stops |
| 98. | Securing Bolts |
| 100. | Side of Bottom Box Walls |
| 102 | Rivets or Screws |
| 104 | Interior Reinforcing Plates |
| 106 | Interior Electronics Module |
| 108. | Latch Plate |
| 110. | Lock Cover Mounting Rod |
| 112. | Rod Brackets |
| 114. | Latch Plate Slot in Lock Housing |
| 116. | Lock Housing |
| 118. | Weather Cover |
| 120. | Hole in Latch Plate |
| 122. | Locking Pin |
| 124. | Cover Plate Mounting Blocks |
| 126. | Lock Body |
| 127. | Conductive Screen Mesh |
| 128 a.b. | Security Screen Assembly |
| 129 | Plastic Paneling |
| 130. | H-Channel |
| 132. | Connecting Wire |
| 134. | Electronic Key |
| 136. | Lock Plunger Release Head |
| 138. | Electronic Key Recessed Contact Plate |
| 140. | Catch |
| 142. | Key Contact Pins |
| 143 a.b. | LED Lights (green/red) |
| 144 a.b. | LED Lights (green/red) |
| 145. | Lock Contacts |
| 146. | Programming Contacts |
| 148. | Orientation Key |
| 150. | Cradle Pin Retaining Grooves |
| 152. | Programming Cradle |
| 154. | Cradle Pins |
| 156. | Laptop or Desktop Computer |
| 158. | Mouse |
| 160. | Screen Display |
| 162. | CPU or Server |
| 164. | Keyboard |
| 166. | Back-up Power Supply/Battery |
| 168. | Printer |
| 170. | Electronics Bay |
| 172. | Trickle Charger |
| 174. | Battery |
| 176. | RF Transceiver/Microprocessor/Controller Unit |
| 178. | GPS Unit |
| 180. | Cover Panel |
| 182. | Red "LED" |

-continued

PARTS LIST

| | |
|---|---|
| 184. | Audio Alarm |
| 186. | Speaker Grill |
| 188, 190. | Magnetic or Button Contact Elements |
| 192. | On/Off Alarm Switch |
| 194. | Lead and Connector to Screen |
| 196. | Sensors |
| 198. | Pager/Cell Network Towers |
| 200. | Electronics Module in Box |
| 202. | Internet |
| 204. | Sensor(s) |
| 206. | In-vehicle or In-Box Transmitter, Transceiver or Transponder/Master GSM |
| 208. | Satellite |
| 210. | Base Station |
| 212. | Transceiver |
| 214. | PIC |
| 216. | I/O Ports |
| 218a. | Signal to Broadcast on Short/Limited Range Frequency |
| 218b. | Signal to Broadcast "Full Range" |
| 220a. | Hardwire |
| 220b. | Wireless |
| Arrow A | Lid Front Half Fold Path |
| Arrow B | Lid Rear Half Fold Path |
| Arrow C | Front Exoskeleton Fold Path |
| Arrow D | Lock Cover Path |
| Arrow E | Weather Cover Pivot Line |
| Arrow F | Electronic Key Turning Motion |
| Arrow G | Opening Motion of Lock |

The invention claimed is:

1. A smart cargo container for secure, trackable, pollable and auditable, shipment and warehousing of products and materials comprising in operative combination:

a unitary container body having two pairs of opposed, spaced, generally orthogonally oriented generally planar vertical side walls integral with a bottom, a first pair of said side walls defining a front wall and a back wall and a second pair defining a left and a right side wall;

a generally planar, openable lid including a margin having a lip for sealingly engaging the tops of said side walls, said lid is hinged to said back wall and includes tangs to engage lid latch members mounted in association with said body front wall;

said body walls, bottom and lid defining a cargo load space;

an auditable electronic lock system integrated into a front panel of an exoskeleton;

said front panel includes a pivoting cover for the body of said electronic lock and for said lid latches to prevent access thereto, said cover including a flange extending over the front lip of said lid and said electronic lock preventing said cover from being opened to reveal said lid latches until said electronic lock is opened by an authorized person at an authorized time or place;

at least one sensor disposed to provide a signal relating to an internal security condition of said cargo container; and a pollable communications module disposed in at least one of said container walls, bottom or top, said module including a battery power supply, a microprocessor controller, an RF transceiver unit and a GPS locator unit, said controller including inputs for said sensor and said GPS unit, and including timing circuit for periodically sending data via RF signals representing a unique identifier of said cargo container, and the status and location of said cargo container.

2. Smart cargo container as in claim 1 wherein said at least one internal security condition sensor is selected from a security screen assembly disposed in the load space to cover at least said left and right side wall to provide a signal to said controller in the event the screen is breached and at least one RF sensor, wherein said lid includes an anti-pry catch system disposed medially along the remaining two walls adjacent their top margin; and wherein the container further comprises an external structural exoskeleton for both said lid and said body, said lid exoskeleton comprising criss-crossed straps and a marginal band, and said body external structural exoskeleton is comprised of three panels, a front panel, a rear panel and a bottom panel, said front and rear panels being hinged at a lower marginal edge to the front and back of said bottom panel, said body exoskeleton panels provide a continuous sling structure for carrying the suspended weight of said container.

3. Smart cargo container as in claim 1 wherein said at least one security condition sensor comprises a sensor disposed in communication with said load space selected from a sensor for: intrusion; ionizing radiation and X-ray; sound; light color, contrast and intensity; ultrasound (US); infra-red (IR); electromagnetic fields; current, voltage and resistance; humidity; pH; temperature, including both external ambient and internal; motion, including change of direction, acceleration and speed; transient vibration, displacement, inclination and shock; pressure, weight, load and force; gases; fine particulates; fumes; chemicals; biologicals, volatile hydrocarbons; smoke; explosives; and immobilizing, irritating, incapacitating or lethal gases, including single components of binary, ternary or quarternary gas mixtures.

4. Smart cargo container as in claim 1 wherein said lid is a divided into two panels hinged to each other, and an anti-pry catch system is disposed on said left and right side walls adjacent the location of said lid panel hinges, body exoskeleton panels are bolted through to the interior of said container and said container includes an audio alarm unit selectively triggerable upon opening said lid.

5. Smart cargo container as in claim 1 wherein said electronic lock system includes a lock body that opens only upon recognition exchange with a programmable key that communicates with said lock body, and said lock system includes at least one memory element that retrievably stores data on lock opening events, including data selected from at least one of time, duration, and unique key identifiers.

6. Smart cargo container as in claim 5 wherein said key is selectively programmable to open only at least one of a plurality of selected containers and to open only at a selected time or location.

7. Smart cargo container as in claim 5 wherein said electronic lock system communicates with said controller module for real time monitoring, reprogramming, and location data.

8. Smart cargo container as in claim 1 which includes a trickle charger for said battery, and an outlet for connection to external power is included in at least one side wall.

9. Smart cargo container as in claim 1 which includes container status lights visible on the exterior of said container, said status including at least one of an armed condition, an open condition, a battery low condition, an attention-required condition, a wrong location warning, and a breach or damage condition.

10. Smart cargo container as in claim 1 wherein said controller reports back condition and location of said container upon RF polling from a separate location.

11. Computer-enabled Internet cargo container tracking system comprising in operative combination:
  a) a plurality of secure cargo containers, each having a body and lid defining a cargo space, said lid being hinged at one end and including tangs for engaging latches to secure said lid on said body;
  b) each said cargo container comprising:
    an auditable electronic lock system secured to a front panel;
    said front panel includes a pivoting cover for the body of said electronic lock and for said lid latches to prevent access thereto, said cover including a flange extending over the front of said lid and said electronic lock preventing said cover from being opened to reveal said lid latches until opened by an authorized person activating said electronic lock at an authorized time or place;
    a pollable communications module disposed in at least one of said container walls, bottom or top, said module including a battery power supply, a microprocessor controller, an RF transceiver unit and a GPS locator unit, said controller including inputs for at least one sensor disposed to provide a signal relating to a security condition of said cargo container and said GPS unit, and including a timer for periodically sending data via RF signals representing a unique identifier of said cargo container, for use in determining the status and location of said cargo container;
  c) a base station including a transceiver for receiving RF signals from said container RF transceiver, and a computer system including: a web server for securely serving pages to clients and a CPU and memory, including operating and applications programs that receive, analyze and save, in at least one database structure, real time and time-related security status and location data from a plurality of said containers, and serve pages to clients, including pages having annotated map information of the container identification, map location and movement and event alerts.

12. Computer-enabled Internet cargo container tracking system as in claim 11 wherein said containers include at least one sensor providing a signal relating to a security condition of said cargo container which is relayed to said base station and postable to said web page for retrieval by said client computer system, wherein the container further comprises an exoskeleton of steel strapping on the lid and steel panels on a front and back side and the bottom, each bolted to said body; and wherein the system further comprises at least one client container monitoring computer system including a CPU, memory, at least one display, and input/output peripherals, said CPU and memory including operating and applications programs that cause said computer to access the Internet and receive and display the web pages served by said server upon entry of client authorization data, said web pages including at least said real time and time-related security status and location data about containers for which said client has authorization to monitor in graphical or text format.

13. Computer-enabled Internet cargo container tracking system as in claim 12 wherein said at least one sensor includes a security screen assembly disposed in the load space to cover at least said left and right side wall to provide a signal to said controller in the event the screen is breached.

14. Computer-enabled Internet cargo container tracking system as in claim 12 wherein said base station or said client monitoring system includes executable code permitting said container to be polled for its location and status at a given time.

15. Computer-enabled Internet cargo container tracking system as in claim 14 wherein said electronic lock system includes a lock body that opens only upon recognition exchange with a programmable key that communicates with said lock body, and said lock system includes at least one memory element that retrievably stores data on lock opening events, including data selected from at least one of time, duration, and unique key identifiers.

16. Computer-enabled Internet cargo container tracking system as in claim 15 wherein said key is selectively programmable to open only at least one of a plurality of selected containers and to open only at a selected time or location.

17. Computer-enabled Internet cargo container tracking system as in claim 16 wherein said electronic lock system communicates with said controller module for real time monitoring, reprogramming, and location data.

18. Computer-enabled Internet cargo container tracking system as in claim 14 wherein said at least one sensor comprises a sensor disposed in communication with said load space selected from a sensor for: intrusion; ionizing radiation and X-ray; sound; light color, contrast and intensity; ultrasound (US); infra-red (IR); electromagnetic fields; current, voltage and resistance; humidity; pH; temperature, including both external ambient and internal; motion, including acceleration; transient vibration, displacement, inclination and shock; pressure, weight, load and force; gases; fine particulates; fumes; chemicals; biologicals, volatile hydrocarbons; smoke; explosives; and immobilizing, irritating, incapacitating or lethal gases, including single components of binary, ternary or quarternary gas mixtures.

19. Computer-enabled Internet cargo container tracking system as in claim 12 wherein said sensors are short range RF sensors, and said controller includes code for processing signals from said sensors into data relating to the condition sensed by said sensors.

20. Computer-enabled Internet cargo container tracking system as in claim 11 wherein said web server system maintains a database of the history of handling of each container tracked and serves said history to said client upon request, said history includes at least one of: a unique identifier for each container; a map graphically showing location and/or movement of said container; opening attempts, times and durations; personnel authorized to open a container; electronic lock configuring information; handling locations and times comprising shipping and storage events; anomalous events sensed by container sensors; ownership of each container; identification of shipper and customer for each shipping and storage period; nature or type and amount of goods shipped or stored, and the times and periods involved.

\* \* \* \* \*